US012794718B2

(12) United States Patent
Steinmetz et al.

(10) Patent No.: US 12,794,718 B2
(45) Date of Patent: Nov. 10, 2026

(54) IDENTITY VALIDATION FOR PROOF OF SPACE

(71) Applicant: Micron Technology, Inc., Boise, ID (US)

(72) Inventors: Joseph Harold Steinmetz, Loomis, CA (US); Luca Bert, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/550,842

(22) Filed: Dec. 14, 2021

(65) Prior Publication Data

US 2023/0188366 A1 Jun. 15, 2023

(51) Int. Cl.

| | |
|---|---|
| ***H04L 29/00*** | (2006.01) |
| ***H04L 9/08*** | (2006.01) |
| ***H04L 9/30*** | (2006.01) |
| ***H04L 9/32*** | (2006.01) |
| *G06F 12/02* | (2006.01) |

(52) U.S. Cl.

CPC .......... *H04L 9/3271* (2013.01); *H04L 9/0861* (2013.01); *H04L 9/30* (2013.01); *H04L 9/3247* (2013.01); *G06F 12/0223* (2013.01); *G06F 2212/1052* (2013.01)

(58) Field of Classification Search

CPC ....... H04L 9/3271; H04L 9/0861; H04L 9/30; H04L 9/3247; G06F 12/0223; G06F 2212/1052

USPC .......................................................... 713/176

See application file for complete search history.

(56) References Cited

U.S. PATENT DOCUMENTS

| | | | |
|---|---|---|---|
| 8,296,380 B1 | 10/2012 | Kelly et al. | |
| 9,674,162 B1 | 6/2017 | Miller et al. | |
| 9,916,478 B2 | 3/2018 | Slik | |
| 10,101,931 B1 | 10/2018 | Camp et al. | |
| 10,552,058 B1 | 2/2020 | Jadon et al. | |
| 10,708,071 B1 * | 7/2020 | Greco | H04L 9/0631 |
| 10,729,030 B1 | 7/2020 | Cousineau et al. | |
| 10,831,691 B1 | 11/2020 | Dazzi et al. | |
| 11,107,071 B2 * | 8/2021 | Carlsson | G06Q 20/3821 |
| 11,418,402 B1 | 8/2022 | Jakobsson | |
| 11,743,058 B2 | 8/2023 | Swaminathan et al. | |

(Continued)

OTHER PUBLICATIONS

Park, Sunoo, et al., "SpaceMint: A Cryptocurrency Based on Proofs of Space." International Conference on Financial Cryptography and Data Security, Dec. 7, 2018.

(Continued)

*Primary Examiner* — Brandon Hoffman
*Assistant Examiner* — Michael D Anderson
(74) *Attorney, Agent, or Firm* — Greenberg Traurig

(57) ABSTRACT

A memory sub-system to show proof of space and identity. The memory sub-system can have a processing device, a storage medium operable to store a proof of space plot, and an integrated circuit having a unique device secret. In response to a proof of space challenge, the processing device can generate a response to the challenge using data in the proof of space plot. The integrated circuit is configured to compute, based on the unique device secret and for a communication associated with the proof of space challenge, identity data representative of an identity of the proof of space plot stored in the memory sub-system. The memory sub-system can provide the identity data in the communication.

21 Claims, 15 Drawing Sheets

(56) References Cited

U.S. PATENT DOCUMENTS

| | | | |
|---|---|---|---|
| 11,775,188 | B2 | 10/2023 | Bert et al. |
| 11,856,058 | B2 | 12/2023 | Bert et al. |
| 11,941,254 | B2 | 3/2024 | Steinmetz et al. |
| 11,960,756 | B2 | 4/2024 | Bert et al. |
| 11,977,742 | B2 | 5/2024 | Steinmetz et al. |
| 12,015,706 | B2 | 6/2024 | Bert et al. |
| 12,045,504 | B2 | 7/2024 | Steinmetz et al. |
| 12,086,432 | B2 | 9/2024 | Bert et al. |
| 12,301,713 | B2 | 5/2025 | Bert et al. |
| 12,579,082 | B2 | 3/2026 | Steinmetz et al. |
| 2006/0288034 | A1 | 12/2006 | Do et al. |
| 2012/0102288 | A1 | 4/2012 | Wideman |
| 2012/0246391 | A1 | 9/2012 | Meir et al. |
| 2014/0136510 | A1 | 5/2014 | Parkkinen et al. |
| 2014/0173268 | A1 | 6/2014 | Hashimoto |
| 2014/0189890 | A1 | 7/2014 | Koeberl et al. |
| 2015/0254108 | A1 | 9/2015 | Kurtzman et al. |
| 2015/0363248 | A1 | 12/2015 | D'abreu |
| 2016/0292672 | A1 | 10/2016 | Fay et al. |
| 2016/0330627 | A1 | 11/2016 | Zhang |
| 2016/0379212 | A1 | 12/2016 | Bowman et al. |
| 2017/0153843 | A1 | 6/2017 | Dewitt et al. |
| 2017/0220292 | A1 | 8/2017 | Hashimoto |
| 2017/0337534 | A1 | 11/2017 | Goeringer et al. |
| 2018/0007025 | A1 | 1/2018 | Oberheide et al. |
| 2018/0145838 | A1 | 5/2018 | Wang et al. |
| 2019/0108518 | A1 | 4/2019 | Asif et al. |
| 2019/0108519 | A1 | 4/2019 | Asif et al. |
| 2019/0243787 | A1 | 8/2019 | Mittal et al. |
| 2019/0280863 | A1* | 9/2019 | Meyer ........................ H04L 9/50 |
| 2019/0324995 | A1 | 10/2019 | Jakobsson |
| 2019/0332763 | A1 | 10/2019 | Berler et al. |
| 2019/0349185 | A1 | 11/2019 | Kim et al. |
| 2019/0370012 | A1 | 12/2019 | Sears et al. |
| 2019/0370069 | A1 | 12/2019 | Swadling et al. |
| 2019/0379642 | A1 | 12/2019 | Simons et al. |
| 2020/0011903 | A1 | 1/2020 | Menzel et al. |
| 2020/0119903 | A1 | 4/2020 | Thomas et al. |
| 2020/0133898 | A1 | 4/2020 | Therene et al. |
| 2020/0134202 | A1 | 4/2020 | Sapuntzakis et al. |
| 2020/0201679 | A1 | 6/2020 | Wentz |
| 2020/0201683 | A1 | 6/2020 | Muskal et al. |
| 2020/0210104 | A1 | 7/2020 | Grosz et al. |
| 2020/0226080 | A1 | 7/2020 | Tarango et al. |
| 2020/0264689 | A1 | 8/2020 | Harms |
| 2020/0265915 | A1 | 8/2020 | Harms |
| 2020/0311314 | A1 | 10/2020 | Troia et al. |
| 2020/0327003 | A1 | 10/2020 | Kang |
| 2020/0356484 | A1 | 11/2020 | Subbarao |
| 2020/0389312 | A1 | 12/2020 | Boneh et al. |
| 2021/0182423 | A1 | 6/2021 | Padmanabhan |
| 2021/0271667 | A1 | 9/2021 | Cohen et al. |
| 2021/0279371 | A1 | 9/2021 | Monji et al. |
| 2021/0281431 | A1 | 9/2021 | Swaminathan et al. |
| 2021/0390179 | A1 | 12/2021 | Hahn et al. |
| 2022/0027355 | A1 | 1/2022 | Cohen et al. |
| 2022/0043937 | A1 | 2/2022 | Spalding et al. |
| 2022/0083683 | A1 | 3/2022 | Murck et al. |
| 2022/0116225 | A1 | 4/2022 | Cohen et al. |
| 2022/0129559 | A1 | 4/2022 | Duval |
| 2022/0131700 | A1 | 4/2022 | Shiner et al. |
| 2022/0131848 | A1 | 4/2022 | Shiner et al. |
| 2022/0294644 | A1 | 9/2022 | Liu et al. |
| 2022/0368596 | A1 | 11/2022 | Jakobsson |
| 2022/0377054 | A1 | 11/2022 | Shukla et al. |
| 2022/0377055 | A1 | 11/2022 | Liu |
| 2022/0400017 | A1 | 12/2022 | Jakobsson |
| 2023/0053269 | A1 | 2/2023 | Yang et al. |
| 2023/0077836 | A1 | 3/2023 | Vohra et al. |
| 2023/0110131 | A1 | 4/2023 | Smith et al. |
| 2023/0115694 | A1 | 4/2023 | Cohen et al. |
| 2023/0132211 | A1 | 4/2023 | Ateniese et al. |
| 2023/0139330 | A1 | 5/2023 | Lee et al. |
| 2023/0168825 | A1 | 6/2023 | Agrawal et al. |
| 2023/0185459 | A1 | 6/2023 | Steinmetz et al. |
| 2023/0185476 | A1 | 6/2023 | Bert et al. |
| 2023/0185482 | A1 | 6/2023 | Steinmetz et al. |
| 2023/0185483 | A1 | 6/2023 | Steinmetz et al. |
| 2023/0185738 | A1 | 6/2023 | Steinmetz et al. |
| 2023/0186289 | A1 | 6/2023 | Bert et al. |
| 2023/0188337 | A1 | 6/2023 | Bert et al. |
| 2023/0188599 | A1 | 6/2023 | Bert et al. |
| 2023/0198770 | A1 | 6/2023 | Agrawal et al. |
| 2023/0244386 | A1 | 8/2023 | Steinmetz et al. |
| 2023/0244393 | A1 | 8/2023 | Bert et al. |
| 2023/0244394 | A1 | 8/2023 | Bert et al. |
| 2024/0192883 | A1 | 6/2024 | Bert et al. |
| 2024/0220132 | A1 | 7/2024 | Steinmetz et al. |
| 2024/0248615 | A1 | 7/2024 | Steinmetz et al. |
| 2024/0273243 | A1 | 8/2024 | Lindskog et al. |
| 2024/0333496 | A1 | 10/2024 | Bert et al. |
| 2024/0370207 | A1 | 11/2024 | Steinmetz et al. |
| 2024/0419345 | A1 | 12/2024 | Bert et al. |
| 2025/0260569 | A1 | 8/2025 | Bert et al. |

OTHER PUBLICATIONS

Title: Solid State Drives with Autonomous Control of Proof of Space Activities U.S. Appl. No. 17/550,736, filed Dec. 14, 2021 Status Date: Mar. 1, 2024 Inventors: Luca Bert, et al. Status: Non Final Action Mailed.

Title: Burn-In Solid State Drives through Generation of Proof of Space Plots in a Manufacturing Facility U.S. Appl. No. 17/550,773, filed Dec. 14, 2021 Status Date: Mar. 13, 2024, Inventors: Joseph Steinmetz, et al. Status: Notice of Allowance Mailed—Application Received in Office of Publications.

Title: Test Memory Sub-Systems through Validation of Responses to Proof of Space Challanges U.S. Appl. No. 17/550,795, filed Dec. 14, 2021 Status Date: Mar. 6, 2024 Inventors: Joseph Steinmetz, et al. Status: Patented Case.

Title: Test Memory Sub-Systems through Validation of Responses to Proof of Space Challenges U.S. Appl. No. 18/608,114, filed Mar. 18, 2024 Status Date: Mar. 18, 2024 Inventors: Joseph Steinmetz, et al. Status: Application Undergoing Preexam Processing.

Title: Combined Cryptographic Key Management Services for Access Control and Proof of Space U.S. Appl. No. 17/550,828, filed Dec. 21, 2021 Status Date: Mar. 19, 2024 Inventors: Luca Bert, et al. Status: Notice of Allowance Mailed—Application Received in Office of Publications.

Title: Management of Storage Space in Solid State Drives to Support Proof of Space Activities U.S. Appl. No. 17/550,967, filed Dec. 14, 2021 Status Date: Mar. 13, 2024 Inventors: Luca Bert, et al. Status: Publications—Issue Fee Payment Verified.

Title: Management of Storage Space in Solid State Drives to Support Proof of Space Activities U.S. Appl. No. 18/582,528, filed Feb. 20, 2024 Status Date: Mar. 6, 2024 Inventors: Luca Bert, et al. Status: Docketed New Case—Ready for Examination.

Title: Automated Participation of Solid State Drives in Activities Involving Proof of Space U.S. Appl. No. 17/550,998, filed Dec. 14, 2021 Status Date: Feb. 12, 2024 Inventors: Joseph Steimetz, et al. Status: Response to Non-Final Office Action Entered and Forwarded to Examiner.

Title: Solid State Drives Configurable to Use Storage Spaces of Remote Device in Activities Involving Proof of Space U.S. Appl. No. 17/591,551, filed Feb. 2, 2022 Status Date: Jan. 18, 2024 Inventors: Joseph Steinmetz, et al. Status: Notice of Allowance Mailed—Application Received in Office of Publications.

Title: Gradually Reclaim Storage Space Occupied by a Proof of Space Plot in a Solid State Drive U.S. Appl. No. 17/591,554, filed Feb. 20, 2022 Status Date: Jan. 19, 2024 Inventors: Luca Bert, et al. Status: Non Final Action Mailed.

Title: Solid State Drives with Autonomous Control of Proof of Space Activities U.S. Appl. No. 17/550,736, filed Dec. 14, 2021 Status Date: Sep. 4, 2024, Inventors: Luca Bert, et al. Status: Final Rejection Mailed.

Title: Burn-In Solid State Drives through Generation of Proof of Space Plots in a Manufacturing Facility U.S. Appl. No. 17/550,773,

(56) References Cited

OTHER PUBLICATIONS filed Dec. 14, 2021 Status Date: Jul. 3, 2024 Inventors: Joseph Steinmetz, et al. Status: Patented Case.
Title: Burn-In Solid State Drives through Generation of Proof of Space Plots in a Manufacturing Facility U.S. Appl. No. 18/778,482, filed Jul. 19, 2024 Status Date: Aug. 1, 2024 Inventors: Joseph Steinmetz, et al. Status: Docketed New Case—Ready for Examination.
Title: Test Memory Sub-Systems through Validation of Responses to Proof of Space Challenges U.S. Appl. No. 17/550,795, filed Dec. 14, 2021 Status Date: Mar. 6, 2024 Inventors: Joseph Steinmetz, et al. Status: Patented Case.
Title: Test Memory Sub-Systems through Validation of Responses to Proof of Space Challenges U.S. Appl. No. 18/608,114, filed Mar. 18, 2024 Status Date: Mar. 29, 2024 Inventors: Joseph Steinmetz, et al. Status: Docketed New Case—Ready for Examination.
Title: Combined Cryptographic Key Management Services for Access Control and Proof of Space U.S. Appl. No. 17/550,828, filed Dec. 14, 2021 Status Date: May 29, 2024 Inventors: Luca Bert, et al. Status: Patented Case.
Title: Combined Cryptographic Key Management Services for Access Control and Proof of Space U.S. Appl. No. 18/743,476, filed Jun. 14, 2024 Status Date: Jun. 30, 2024 Inventors: Luca Bert, et al. Status: Docketed New Case—Ready for Examination.
Title: Solid State Drives with Hardware Accelerators for Proof of Space Computations U.S. Appl. No. 17/550,914, filed Dec. 14, 2021 Status Date: Mar. 12, 2024 Inventors: Joseph Steinmetz, et al. Status: Advisory Action Mailed.
Title: Management of Storage Space in Solid State Drives to Support Proof of Space Activities U.S. Appl. No. 17/550,967, filed Dec. 14, 2021 Status Date: Mar. 27, 2024 Inventors: Luca Bert, et al. Status: Patented Case.
Title: Management of Storage Space in Solid State Drives to Support Proof of Space Activities U.S. Appl. No. 18/582,528, filed Feb. 20, 2024 Status Date: Sep. 6, 2024 Inventors: Luca Bert, et al. Status: Non Final Action Mailed.
Title: Automated Participation of Solid State Drives in Activities Involging Proof of Space U.S. Appl. No. 17/550,998, filed Dec. 14, 2021 Status Date: Aug. 6, 2024 Inventors: Joseph Steimetz, et al. Status: Prosecution Suspended.
Title: Peer to Peer Transfer of Proof of Space Plots to or from Solid State Drives U.S. Appl. No. 17/551,024, filed Dec. 14, 2021 Status Date: Dec. 6, 2023 Inventors: Luca Bert, et al. Status: Patented Case.
Title: Communications to Reclaim Storage Space Occupied by Proof of Space Plots in Solid State Drives U.S. Appl. No. 17/591,548, filed Feb. 2, 2022 Status Date: Sep. 13, 2023 Inventors: Luca Bert, et al. Status: Patented Case.
Title: Solid State Drives Configurable to Use Storage Spaces of Remote Device in Activities Involving Proof of Space U.S. Appl. No. 17/591,551, filed Feb. 2, 2022 Status Date: Apr. 17, 2024 Inventors: Joseph Steinmetz, et al. Status: Patented Case.
Title: Solid State Drives Configurable to Use Storage Spaces of Remote Device in Activities Involving Proof of Space U.S. Appl. No. 18/624,547, filed Apr. 2, 2024 Status Date: Apr. 15, 2024 Inventors: Joseph Steinmetz, et al. Status: Docketed New Case—Ready for Examination.
Title: Gradually Reclaim Storage Space Occupied by a Proof of Space Plot in a Solid State Drive U.S. Appl. No. 17/591,554, filed Feb. 2, 2022 Status Date: Aug. 21, 2024 Inventors: Luca Bert, et al. Status: Patented Case.
Title: Gradually Reclaim Storage Space Occupied by a Proof of Space Plot in a Solid State Drive U.S. Appl. No. 18/821,038, filed Aug. 30, 2024 Status Date: Aug. 30, 2024 Inventors: Luca Bert, et al. Status: Application Undergoing Preexam Processing.
Dziembowski, Stefan, et al., "Proofs of Space." International Association for Cryptologic Research, 2015.
Park, Sunoo, et al., "SpaceMint: A Cryptocurrency Based on Proofs of Space." 22nd International Conference on Financial Cryptography and Data Security, 2018.

* cited by examiner

IDENTITY VALIDATION FOR PROOF OF SPACE

TECHNICAL FIELD

At least some embodiments disclosed herein relate to memory systems in general, and more particularly, but not limited to memory systems configured to support proof of space activities.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
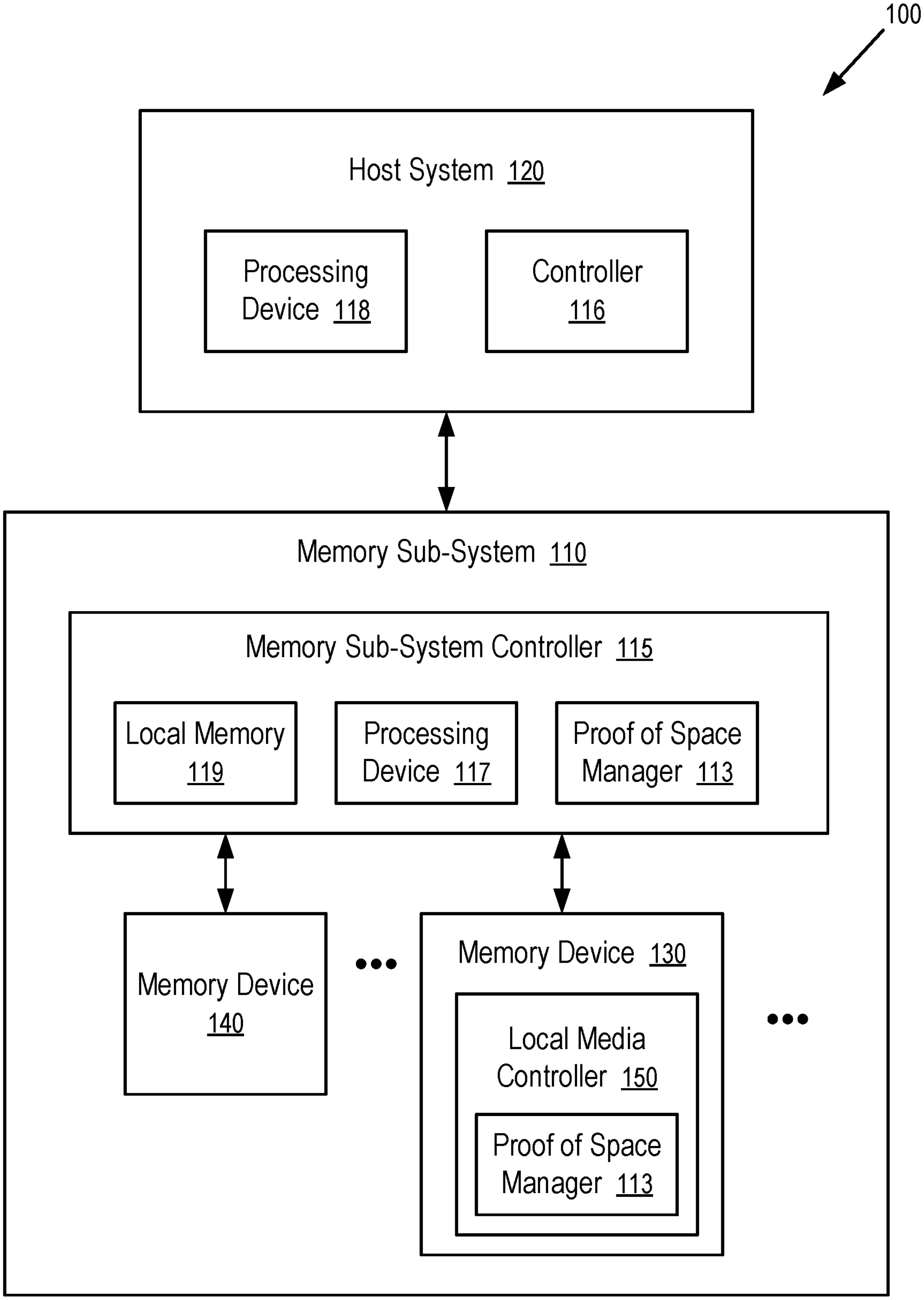
FIG. 1 illustrates an example computing system having a memory sub-system in accordance with some embodiments of the present disclosure.

At least some aspects of the present disclosure are directed to device identity validation for proof of space activities. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A conventional memory sub-system, such as a hard disk drive (HDD) or a solid state drive (SSD), can be used in activities that require the proof of data storage space. There are known types of challenge-response computations that can be implemented via a set of lookup tables. When the lookup tables are stored in the hard drive or solid state drive, a correct response to a challenge can be generated efficiently using the lookup tables with little computing power and energy consumption. Without storing the lookup tables, it can be unfeasible and/or impractical to generate the correct response on the fly within a short period of time. Thus, in response to a challenge, a correct response to the challenge, generated within a threshold period of time from the challenge, can be seen as a result of the response being generated using the lookup tables stored in a data storage device. Storing the lookup tables occupies an amount of data storage space. Thus, the correct response can be used as a proof of the possession of the amount of spare storage space that is currently used to store the lookup tables. A cryptocurrency network can use proof of space (e.g., to replace proof of work used in other cryptocurrency networks, such as Bitcoin) to improve energy efficiency of computations related to cryptocurrency activities. For example, Chia Network uses proof of space and time to replace energy intensive proof of work.

In general, a plot suitable for proof of space includes data used in challenge-response activities. Such data of a plot typically includes a set of lookup tables with numbers that appear to be random and that are generated from a small amount of initial data. For a given challenge as an input, the lookup tables of the plot can be used to generate a response with very little time and computation and thus little energy expenditure. The correctness of the response can be easily verified using the initial data without the lookup tables. However, it is very difficult and statistically impossible to generate the correct response without the lookup tables. Thus, the correct response can be used as a proof that the response is from an entity having the lookup tables and thus the storage space occupied by the plot of lookup tables. The use of plots to generate responses to proof of space challenges in a cryptocurrency network can be referred to as plot farming.

A correct response to a proof of space challenge shows that the response is generated using a data storage device having an amount of data storage capacity being currently used to store a proof of space plot. However, the response lacks an indication of an identity of the data storage device.

At least some aspects of the present disclosure address the above and other deficiencies and challenges by augmenting the proof of space with a proof of identity of a data storage device.

For example, the data storage device can include a secure memory device having a unique device secret usable as the basis for the validation of the identity of the memory device and/or a memory sub-system having the secure memory device. The memory sub-system and/or the memory device can be configured to generate a digital signature based on the unique device secret. When validated, the digital signature shows that the memory device is an authentic product from a manufacturer, is owned by an entity, and/or is currently storing a proof of space plot at a particular location within the memory sub-system.

The memory device can include optionally security features, including operations related to cryptocurrency. Cryptographic keys representative of owner privileges can be used to sign a command to enable the security features. The memory device is configured to verify the digital signature signed for the command using a corresponding cryptographic key before allowing the command to be executed within the memory device.

For example, a proof of space plot generated and/or stored in the memory sub-system can be used to show the identity of the memory sub-system and the reservation of the data storage space for the plot. The combined proof of space and identity can be used to implement cryptocurrency activities with improved security. For example, to be elected to perform an action in a cryptocurrency network (e.g., recording a block in a blockchain), a computer system can be required to show the proof of space and identity.

Blocks created in a blockchain implemented based on proof of space can be required to have digital signatures signed using cryptographic keys representative of proof of space plots. In some implementations, a plot key is used to represent a plot; and a plot pool key is used to represent a pool of plots.

For example, a plot key pair of asymmetric cryptography can have a public plot key and a corresponding private plot key usable to represent a plot individually; a plot pool key pair can have a public plot pool key and a corresponding private plot pool key usable to represent a pool of plots. To be valid a block in a blockchain can be required to be signed using the private plot key and the private plot pool key for verification using the corresponding public plot key and the corresponding public plot pool key.

A security server can be configured to sign using a private plot pool key, for plots in a pool after verifying that the device identities of the memory sub-systems hosting the plots. Thus, the valid plot pool signature can be seen a proof of identity of the memory sub-systems.

Optionally, the security server can manage cryptographic keys representative of proof of space plots generated using memory sub-systems having the memory regions in combination with managing cryptographic keys representative of privileges to access the secure memory regions.

For example, secure memory devices can be configured to control access to a secure memory region based on cryptographic keys representative of privileges to access the secure memory region. A command to access the secure memory region can be required to be digitally signed using a correct cryptographic key. A key management server (e.g., operated by a manufacturer of secure memory devices) can be configured to secure and manage the cryptographic keys that represent privileges to access secure memory regions in secure memory devices. The key management server can digitally sign commands configured to access secure memory regions using corresponding cryptographic keys after verifying the identities of the devices that generate the commands.

The key management server can be further configured to secure and manage the cryptographic keys representative of plots generated in memory sub-systems having the secure memory devices.

For example, the plot pool signatures can be configured as a privilege associated with secure memory devices and used in blockchains with proof of space. Plots generated in a memory sub-system having a secure memory device can be organized in a pool controlled by a plot pool key associated with an identity of the secure memory device. Optionally, a plot can be placed in a pool by itself to facilitate management in fine granularity.

For example, the key management server can generate a pair of asymmetric cryptographic keys usable as a pair of plot pool keys. The key management server secures the private plot pool key and uses it to sign blocks created through plots generated using the secure memory devices or memory sub-systems having the secure memory devices.

For example, proof of space plots can be pre-generated on new solid state drives as by-products of a manufacturing process, or generated autonomously and/or automatically while installed in a computer system. At the time of plot generation, the entities that will subsequently use the plots may be unknown. Instead arranging to pool the plots directly for the entities that will eventually farm the plots, the plots generated in the solid state drives can be arranged to in a pool represented by a pair of plot pool keys managed by the key management server (e.g., operated by the manufacturer of secure memory devices).

The key management server can be configured to sign the blocks for the plots in the pool using the private plot pool key secured in the key management server. Alternatively, the key management server can be configured to transfer the private plot pool key to a computer system that subsequently farm the plots.

Optionally, certain users of a cryptocurrency network can choose to join such a plot pool represented by the private plot pool key secured in the key management server. The key management server can provide the service of signing their blocks using the private plot pool key.

With the services offered by the key management server, the usages of the plots can be simplified; and it is not necessary to arrange for a separate server to sign the blocks created by the users opted to join the plot pool represented by a private plot pool key stored in the key management server. Further, plots can be transferred and/or used by different entities.

To generate a proof of space plot, a conventional memory sub-system, such as a hard drive or a solid state drive, is to be connected to a host system. The memory sub-system provides the storage space required for the generation of the plot. The host system provides the processing power for the computation involved in the generation of the plot. The host system computes the values in the lookup tables in the plot and generates the read/write commands to operate on the storage space provided by the memory sub-system. The computation tasks performed during the plot generation can be a significant burden for the host system.

Optionally, a memory sub-system can have a logic circuit adapted to accelerate the computations involved in plot generation. The logic circuit is designed to perform computationally intensive operations that are common during plot generation. For example, Basic Linear Algebra Subprograms (BLAS) are typically implemented via instructions executed on a general-purpose microprocessor and used in plot generation. Some of the operations in the Basic Linear Algebra Subprograms (BLAS), such as Multiply-Accumulate (MAC) can be implemented via a hardware circuit. Such a Multiply-Accumulate (MAC) unit can be used as a computation accelerator to reduce the computational burden on a microprocessor used to implement the computation of plot generation.

For example, when a solid state drive is configured with a computation accelerator (e.g., one or more Multiply-Accumulate (MAC) units), a controller or processor in the solid state drive can be configured (e.g., via firmware) to perform the computations of plot generation that is conventionally performed by a host system connected to the solid state drive. With the computation accelerator performing and accelerating a significant portion of the computation of plot generation, the solid state drive can perform plot generation with improved performance and/or efficiency without assistance from the host system. In some implementations, the solid state drive can perform plot generation without a host system being connected to solid state drive, or with a host system connected to the solid state drive being in a sleep mode, a low energy mode, or a hibernation mode. Optionally, the host system can use the computation accelerator to perform part of the computations of plot generation to reduce the use of the computing resources of the host system during plot generation.

Further, the computation accelerator implemented in the solid state drive can be used by the host system connected to the solid state drive to accelerate other computations that involve Basic Linear Algebra Subprograms (BLAS) and data stored in the solid state drive, such as computations of Artificial Neural Networks.

For example, when the computation accelerator in the solid state drive is not by the host system of the solid state drive, the computation accelerator can be used to accelerate plot generation in background operations of the solid state drive. The plots generated by the solid state drive in the background operation can be used in a cryptocurrency network. Optionally, the plots generated by the solid state drive can be offloaded to hard disk drives for plot farming.

Optionally, the solid state drive can include a cryptographic engine implemented via a hardware circuit to acceleration cryptographic calculations. The cryptographic engine can be used to accelerate the computations involved in the activities in a cryptocurrency network. With the acceleration in cryptographic calculations, the solid state drive can be configured to participate in a cryptocurrency network autonomously, without assistance from the host system (e.g., without the host system, or with the host system being in a sleep mode, a low energy mode, or a hibernation mode).

Optionally, the cryptographic engine is also used to implement a security manager that controls access to the storage capacity of the memory sub-system via cryptographic keys, and/or protects the integrity of the data stored in the memory sub-system for a root of trust in computing.

In one implementation, an internal host with the computation accelerator is provided in a memory sub-system to control proof of space activities. For example, a solid state drive (SSD) can be configured with a host interface to provide storage services to a host system in a conventional way and, in addition, be configured with an internal host. Using the internal host, the solid state drive (SSD) can participate in proof of space activities and/or cryptocurrency activities in an autonomous way without the supervision and/or computing resources of an external host system connected to the host interface. For example, in the absence of commands from the host system connected to the host interface, the internal host of the solid state drive can be configured to automatically detect a network connection, generate read/write commands, and perform computations to participate in proof of space activities and/or cryptocurrency activities.

For example, independent of host activities and/or without the host system being active and/or connected to the host interface, the internal host can perform tasks such as plot generation, plot farming, etc. Thus, the solid state drive (SSD) as a spare component can be used in proof of space before being connected to a host system for normal usage.

The internal host can be configured to use the free space that is not yet used by a host system to generate and/or store one or more plots for proof of space. For example, the internal host can use a plot stored in the memory sub-system (e.g., a hard disk drive (HDD), a solid state drive (SSD), or a memory module) to generate responses for challenges, such as proof of space and time challenges in a cryptocurrency network (e.g., Chia Network, or similar networks). The use of plots to generate responses to proof of space challenges can be referred to as plot farming.

For improved security, aspects of proof of space activities and/or cryptocurrency activities of the internal host can be configured and/or regulated via configuration data specified using an administrative application. For example, the administrative control of the internal host can be accessed via the host system connected to the host interface of the memory sub-system. Alternatively, or in combination, the administrative control of the internal host can be accessed via a network connection (e.g., without the host system being active or being connected to the host interface).

In some implementations, the memory sub-system can be operational for proof of space activities and/or cryptocurrency activities even without a host system (or with the host system being placed in a sleep mode, a low energy mode, or a hibernation mode). For example, connecting the memory sub-system to a power supply and a network interface card can be sufficient to allow the memory sub-system to operate in a cryptocurrency network. Alternatively, the memory sub-system can be configured to operate in a cryptocurrency network under the condition that the memory sub-system is being connected to a host system that permits the memory sub-system to operate (e.g., when the host system is in an idle state, or independent of the activities of the host system). In some instances, the memory sub-system includes a network interface card, or a wireless transceiver for a network connection to a wireless access point. Thus, before the memory sub-system is installed in a computing system and/or connected to a host system to provide memory and/or storage services for the host system, the internal host of the memory sub-system can allow the free/available storage space of the memory sub-system to be used as a storage appliance in a cryptocurrency network for proof of space.

The internal host can be used to reduce the computation burden on the host system connected to the host interface of the memory sub-system. For example, the host system and the internal host can operate in a collaborative mode where the host system can delegate some or all of the computing tasks to the internal host.

In general, the administrative control can be used to specify whether the internal host is permitted to run autonomously, how much of the resources the internal host can use and when, what types of activities (e.g., plot generation, plot farming) are permitted, etc.

For further improved security, the internal host can be implemented via a secure memory device. For example, the firmware and/or configuration data of the internal host for proof of space activities and/or cryptocurrency activities can be protected via a security manager of the secure memory device. The security manager can prevent authorized access and/or modifications of the firmware and/or configuration data, and prevent the use of corrupted and/or tampered firmware and/or configuration data.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

In general, a memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or such a computing device that includes memory and a processing device.

The computing system 100 can include a host system 120 that is coupled to one or more memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

For example, the host system 120 can include a processor chipset (e.g., processing device 118) and a software stack executed by the processor chipset. The processor chipset can include one or more cores, one or more caches, a memory controller (e.g., controller 116) (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, a universal serial bus (USB) interface, a Fibre Channel, a Serial Attached SCSI (SAS) interface, a double data rate (DDR) memory bus interface, a Small Computer System Interface (SCSI), a dual in-line memory module (DIMM) interface (e.g., DIMM socket interface that supports Double Data Rate (DDR)), an Open NAND Flash Interface (ONFI), a Double Data Rate (DDR) interface, a Low Power Double Data Rate (LPDDR) interface, a Compute Express Link (CXL) interface, or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The processing device 118 of the host system 120 can be, for example, a microprocessor, a central processing unit (CPU), a processing core of a processor, an execution unit, etc. In some instances, the controller 116 can be referred to as a memory controller, a memory management unit, and/or an initiator. In one example, the controller 116 controls the communications over a bus coupled between the host system 120 and the memory sub-system 110. In general, the controller 116 can send commands or requests to the memory sub-system 110 for desired access to memory devices 130, 140. The controller 116 can further include interface circuitry to communicate with the memory sub-system 110. The interface circuitry can convert responses received from the memory sub-system 110 into information for the host system 120.

The controller 116 of the host system 120 can communicate with the controller 115 of the memory sub-system 110 to perform operations such as reading data, writing data, or erasing data at the memory devices 130, 140 and other such operations. In some instances, the controller 116 is integrated within the same package of the processing device 118. In other instances, the controller 116 is separate from the package of the processing device 118. The controller 116 and/or the processing device 118 can include hardware such as one or more integrated circuits (ICs) and/or discrete components, a buffer memory, a cache memory, or a combination thereof. The controller 116 and/or the processing device 118 can be a microcontroller, special purpose logic circuitry (e.g., a field programmable gate array (FPGA), an application specific integrated circuit (ASIC), etc.), or another suitable processor.

The memory devices 130, 140 can include any combination of the different types of non-volatile memory components and/or volatile memory components. The volatile memory devices (e.g., memory device 140) can be, but are not limited to, random access memory (RAM), such as dynamic random access memory (DRAM) and synchronous dynamic random access memory (SDRAM).

Some examples of non-volatile memory components include a negative-and (or, NOT AND) (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell.

Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs, or any combination of such. In some embodiments, a particular memory device can include an SLC portion, an MLC portion, a TLC portion, a QLC portion, and/or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations (e.g., in response to commands scheduled on a command bus by controller 116). The controller 115 can include hardware such as one or more integrated circuits (ICs) and/or discrete components, a buffer memory, or a combination thereof. The hardware can include digital circuitry with dedicated (i.e., hard-coded) logic to perform the operations described herein. The controller 115 can be a microcontroller, special purpose logic circuitry (e.g., a field programmable gate array (FPGA), an application specific integrated circuit (ASIC), etc.), or another suitable processor.

The controller 115 can include a processing device 117 (processor) configured to execute instructions stored in a local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 does not include a controller 115, and can instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory devices 130. The controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory devices 130.

In some embodiments, the memory devices 130 include local media controllers 150 that operate in conjunction with the memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 150) for media management within the same memory device package. An example of a managed memory device is a managed NAND (MNAND) device.

The controller 115 and/or a memory device 130 can include a proof of space manager 113 configured to use the storage capacity of the memory sub-system 110 to show proof of space without the help or commands from the host system 120. In some embodiments, the controller 115 in the memory sub-system 110 includes at least a portion of the proof of space manager 113. In other embodiments, or in combination, the controller 116 and/or the processing device 118 in the host system 120 includes at least a portion of the proof of space manager 113. For example, the controller 115, the controller 116, and/or the processing device 118 can include logic circuitry implementing the proof of space manager 113. For example, the controller 115, or the processing device 118 (processor) of the host system 120, can be configured to execute instructions stored in memory for performing the operations of the proof of space manager 113 described herein. In some embodiments, the proof of space manager 113 is implemented in an integrated circuit chip disposed in the memory sub-system 110. In other embodiments, the proof of space manager 113 can be part of firmware of the memory sub-system 110, an operating system of the host system 120, a device driver, or an application, or any combination therein.

For example, the proof of space manager 113 implemented in the controller 115 can control the memory sub-system 110 to generate plots and/or farm plots in a cryptocurrency network without relying on the computing resources of the host system 120. The host system 120 can be in a low power mode, a sleep mode, or a hibernation mode, while the proof of space manager 113 is sufficient to operate the memory sub-system 110 to participate activities in a cryptocurrency network. The proof of space manager 113 can function as a host, specialized for proof of space activities and/or cryptocurrency activities, such that resources in the memory sub-system 110 that are not used by the host system 120 can be used to gain benefits of participating in proof of space activities and/or cryptocurrency activities.

When the memory sub-system 110 is in communication with the host system 120, the host system 120 can send commands to configure the operations of the proof of space manager 113. For example, the host system 120 can provide a user interface that is usable to specify whether the proof of space manager 113 is permitted to operate autonomously without instructions/requests from the host system 120. The permission can be specified by writing data to a register, or a predetermined location or region within a memory device (e.g., 130 or 140) in the memory sub-system 110. Similarly, the host system 120 can write configuration data into the memory sub-system 110 to specify how much of the storage capacity of the memory sub-system 110 can be used by the proof of space manager 113 in proof of space activities, when or under what conditions the proof of space activities are permitted, whether plot generation is permitted, whether plot farming is permitted, etc.

Optionally, the proof of space manager 113 can use a network connection without going through the host system 120; and the configuration data can be specified for the proof of space manager 113 via the network connection. For example, the memory sub-system 110 can include an interface for a connection to a network interface card, or a wireless transceiver for a wireless network connection to an access point. The interface is usable by the proof of space manager 113 without the processing device 118 and/or the controller 116 of the host system 120. In some implementations, the memory sub-system 110 can further include a network interface card and/or a wireless transceiver (e.g., for a wired network connection, for a WiFi connection, or Bluetooth connection, or a cellular communications connection); and providing power to the memory sub-system 110 with a connection to the Internet is sufficient to enable the memory sub-system 110 to operate in a cryptocurrency network.

Figure 2:
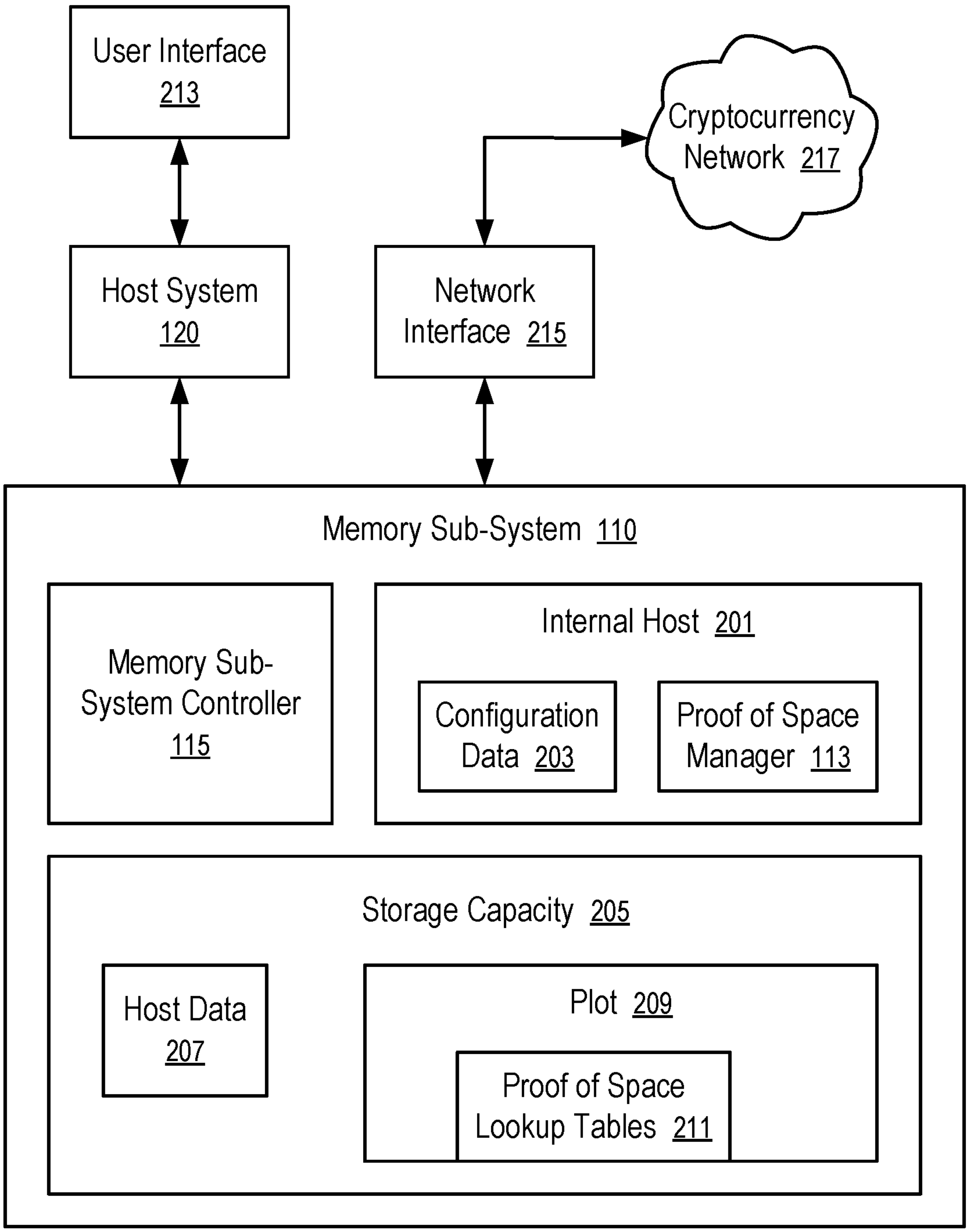
FIG. 2 shows a memory sub-system having an internal host to control proof of space activities according to one embodiment.

FIG. 2 shows a memory sub-system 110 having an internal host 201 to control proof of space activities according to one embodiment. For example, the memory sub-system 110 of FIG. 1 can be implemented according to FIG. 2.

In FIG. 2, the memory sub-system 110 has a memory sub-system controller 115 and an internal host 201. The internal host 201 has configuration data 203 and a proof of space manager 113 operable according to the permissions and restrictions specified in the configuration data 203.

When the memory sub-system 110 is not connected to the host system 120, the internal host 201 can function as a replacement host system of the memory sub-system 110 and control the operations of the memory sub-system 110 and the network interface 215.

For example, the internal host 201 can detect the connection to a network interface 215 and issue commands to the network interface 215 and the memory sub-system controller 115 in a way similar to the host system 120 using the memory sub-system 110 and the network interface 215. The proof of space manager 113 can use a portion of the storage capacity 205 of the memory sub-system 110 to store a plot 209 that includes proof of space lookup tables 211.

For example, the storage capacity 205 of the memory sub-system 110 can include the storage capacities of memory devices 130, 140 (e.g., illustrated in FIG. 1) configured in the memory sub-system 110. A portion of the storage capacity 205 can be reserved for servicing the host system 120 and store host data 207 received from the host system 120. Another portion of the storage capacity 205 that is not going to be used by the host system 120 for a period of time can be used to store a plot 209. Since the plot 209 is used to store the proof of space lookup tables 211, the storage space occupied by the plot 209 is not available for use by the host system 120 and thus considered the free/spare storage space.

To generate the plot 209, the internal host 201 can receive a small amount of initial data and perform computations to compute the numbers in the proof of space lookup tables 211 according to a predefined computing procedure. In general, any algorithms of proof of space can be used; and the implementation of the proof of space manager 113 is not limited to a particular cryptocurrency network (e.g., Chia Network).

To farm the plot 209, the internal host 201 can receive a challenge and use the plot 209 to generate a response that can be easily validated using the small amount of the initial data. The correct, validated response can be seen as a proof that the large amount of data of the plot 209 is stored in a storage space (e.g., in storage capacity 205 provided by memory devices 130, . . . , 140 of the memory sub-system 110).

Optionally, the host system 120 can also run an application to generate plots (e.g., as part of the host data 207) and farm the plots. Thus, the memory sub-system 110 is operable to have two parallel systems for plot generating and farming.

For example, the host system 120 can allocate a portion of the storage capacity 205 as a namespace. The memory sub-system controller 115 maps a logical address in the namespace into a physical address in the memory device(s) 130, . . . , 140 to store the host data 207. The internal host 201 is allowed to allocate a portion of the storage capacity 205 not used by the host system 120 as another namespace to store plot 209 controlled by the internal host 201. In some implementations, the internal host 201 and/or the host system 120 can use a separate namespace for each plot (e.g., 209) to simplify storage space management. When the storage space currently used by a plot (e.g., 209) is needed, the corresponding namespace can be deleted to free up the storage space occupied by the plot (e.g., 209).

In one implementation, the memory sub-system 110 is configured with two host interfaces. An external host interface of the memory sub-system 110 is connectable to an external host system 120; and an internal host interface is connected to the internal host 201. The memory sub-system controller 115 is accessible via any of the two host interfaces to receive read/write commands from the external host system 120 and the internal host 201 respectively. For example, the internal host 201 can include a processing device (processor) that is separate from the processing device 117 of the memory sub-system controller 115; and the proof of space manager 113 can be implemented via a special purpose logic circuit (e.g., a field programmable gate array (FPGA), an application specific integrated circuit (ASIC), a System on a Chip (SoC)), or a set of instructions executed by the processing device (processor).

In another implementation, the internal host 201 is implemented via firmware running in the processing device 117 of the memory sub-system controller 115. Thus, a portion of the processing power of the memory sub-system controller 115 can be used to execute the instructions of the proof of space manager 113 (e.g., to generate read/write commands of the internal host 201) without a physical host interface between the memory sub-system controller 115 and the internal host 201.

The host system 120 can run an application to provide a user interface 213 to specify and/or adjust the configuration data 203 of the internal host 201. Alternatively, a user device (e.g., a mobile phone, a tablet computer, a notebook computer, a personal computer, a personal media player) can be connected to the network interface 215 to specify and/or adjust the configuration data 203. The network interface 215 can include a transceiver for a wired or wireless network connection, such as a local area network, a wireless local area network, a personal area network, a cellular communications network, etc. The network interface 215 can be connected to a cryptocurrency network 217 that implements a blockchain using proof of space to regulate activities or transactions.

Figure 3:
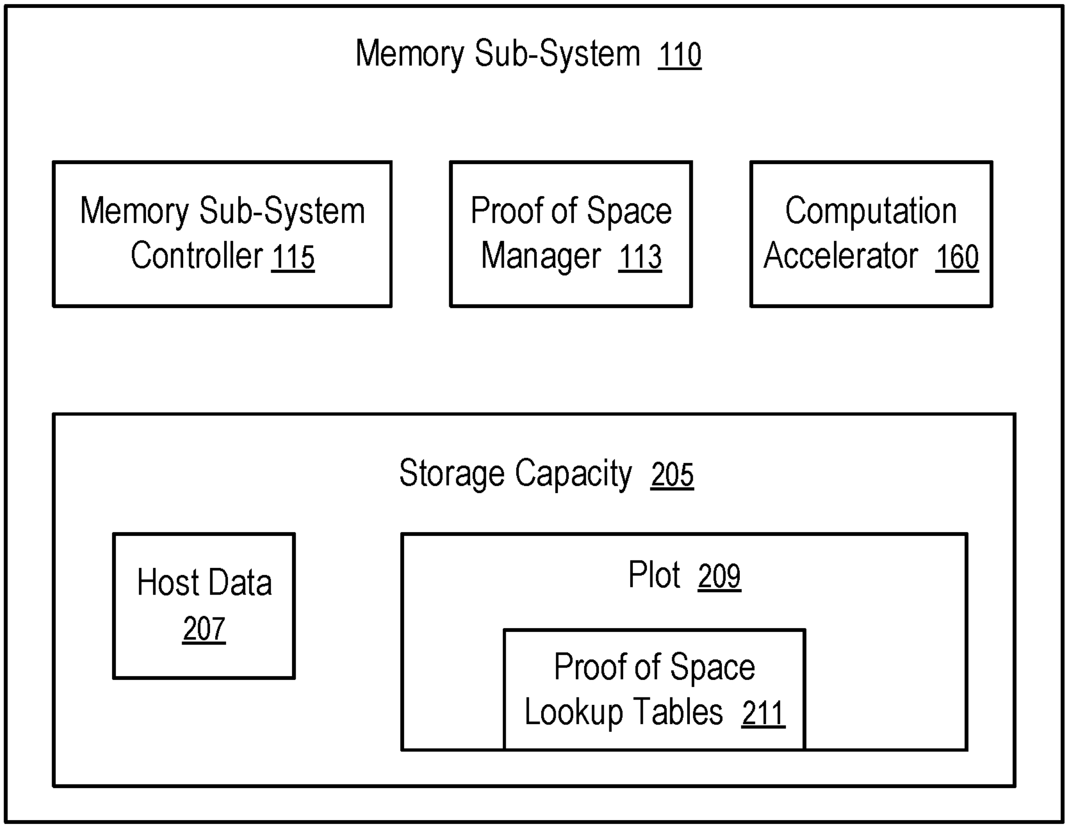
FIG. 3 shows a memory sub-system having a computation accelerator according to one embodiment.

FIG. 3 shows a memory sub-system having a computation accelerator according to one embodiment. For example, the memory sub-system 110 of FIG. 1 and/or FIG. 2 can be configured to include a computation accelerator as in FIG. 3.

In FIG. 3, the memory sub-system 110 has a computation accelerator 160 implemented via a hardware circuit. For example, a logic circuit can be configured to perform a frequently used computation involved in proof of space activities, such as plot generation.

Plot generation can be implemented using Basic Linear Algebra Subprograms (BLAS). Typically, Basic Linear Algebra Subprograms (BLAS) are implemented via software programs that are executable by general-purpose microprocessors. Hardware accelerators of Basic Linear Algebra Subprograms (BLAS) can be used as a computation accelerator 160 in the memory sub-system 110 to perform operations faster and more efficiently than a general-purpose microprocessors, such as Multiply-Accumulate (MAC) operations. When such operations are performed within the memory sub-system 110, the data transfer between the memory sub-system 110 and the host system 120 of the memory sub-system 110 can be reduced for improved usage of the communication bandwidth between the memory sub-system 110 and the host system 120.

In general, the computation accelerator 160 can be used by the host system 120 and the proof of space manager 113.

When the computation accelerator 160 is not used by the host system 120, the proof of space manager 113 can use the computation accelerator 160 in plot generation.

For example, the proof of space manager 113 can generate commands to the memory sub-system controller 115 to collect data from its storage capacity 205 into a buffer (e.g., local memory 119) and instruct the computation accelerator 160 to perform an operation. The result generated by the computation accelerator 160 can be stored into the storage capacity 205 as part of the plot 209, and/or as an intermediate result used in further computation of entries of the proof of space lookup tables 211.

Figure 4:
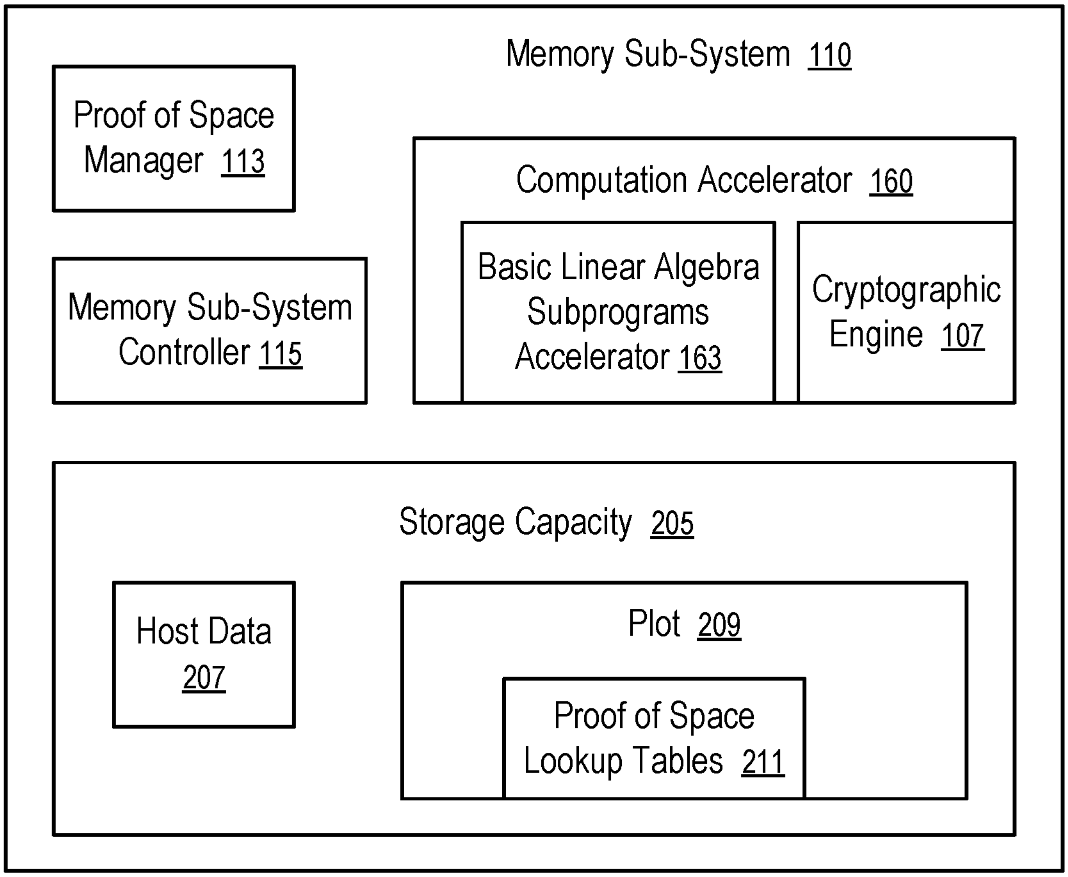
FIG. 4 shows a memory sub-system having accelerators for proof of space and/or cryptocurrency activities according to one embodiment.

Optionally, as illustrated in FIG. 4, the computation accelerator 160 includes a circuit adapted to perform cryptographic operations.

FIG. 4 shows a memory sub-system having accelerators for proof of space and/or cryptocurrency activities according to one embodiment.

For example, the computation accelerator 160 of the memory sub-system 110 of FIG. 3 can be implemented in a way as in FIG. 4.

In FIG. 4, the computation accelerator 160 includes a cryptographic engine 107. The cryptographic engine 107 can be implemented via a logic circuit adapted to perform cryptographic operations, such as applying a cryptographic hash function to a data item to generate a hash value, encrypting a data item to generate cipher text using a cryptographic key, decrypting cipher text to recover a data item using a corresponding cryptographic key, generating a cryptographic key of symmetric cryptography and/or a pair of cryptographic keys of asymmetric cryptography, etc.

For example, the computation accelerator 160 of FIG. 4 can be used to implement an internal host 201 of the memory sub-system 110. The cryptographic engine 107 can be used to accelerate the internal host 201 in participation in cryptocurrency activities on the cryptocurrency network 217 without assistance from a connected host system 120. For example, the cryptographic engine 107 can be used in creation of digital signatures on responses to proof of space challenges.

The computation accelerator 160 includes a Basic Linear Algebra Subprograms accelerator 163, such as a logic circuit adapted to perform Multiply-Accumulate (MAC) operations. When the computation of the proof of space manager 113 is accelerated via the use of the computation accelerator 160, the performance of the memory sub-system 110 in proof of space activities and/or cryptocurrency activities can be improved.

Optionally, a host system 120 connected to the memory sub-system 110 (e.g., as in FIG. 1 and/or FIG. 2) actively controls the proof of space activities and/or cryptocurrency activities. Since the computation accelerator 160 can perform some of the operations involving Basic Linear Algebra Subprograms (BLAS) and/or cryptography, the computation burden on the host system 120 is reduced; and the impact of proof of space activities and/or cryptocurrency activities on the performance of the host system 120 in performing other tasks is reduced.

Figure 5:
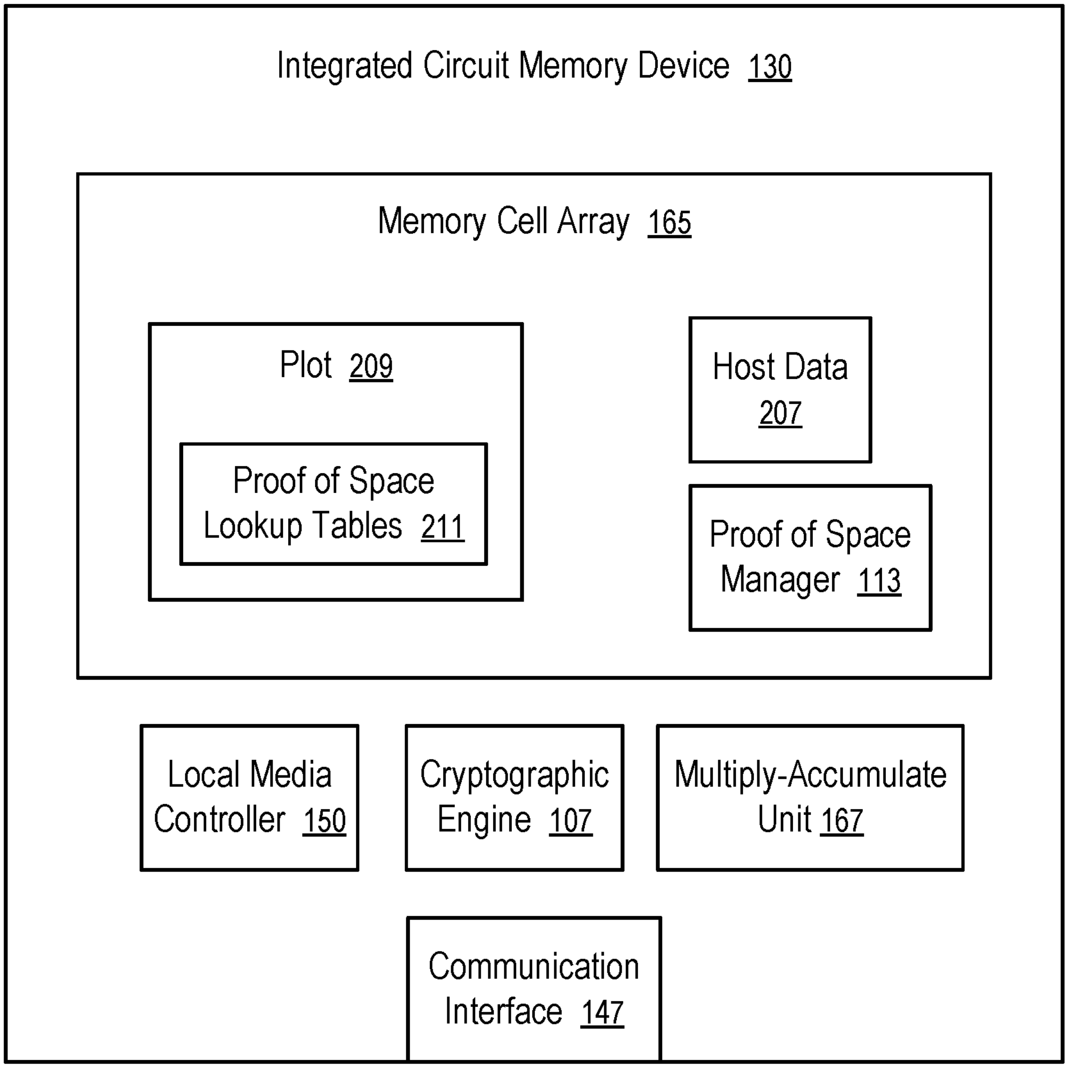
FIG. 5 shows an integrated circuit memory device having hardware accelerators for cryptographic computations and proof of space plot generation according to one embodiment.

Optionally, the computation accelerator 160 can be implemented in an integrated circuit memory device 130, as illustrated in FIG. 5. For example, in some implementations, a memory sub-system 110 is a ball grid array (BGA) solid-state drive (SSD) configured in an integrated circuit package.

FIG. 5 shows an integrated circuit memory device having hardware accelerators for cryptographic computations and proof of space plot generation according to one embodiment.

For example, the memory sub-system 110 of FIG. 1, FIG. 2, FIG. 3 and/or FIG. 4 can be implemented using or as an integrated circuit memory device 130 of FIG. 5.

In FIG. 5, the integrated circuit memory device 130 has a communication interface 147, a local media controller 150, a cryptographic engine 107, and a Multiply-Accumulate Unit 167, and a memory cell array 165.

For example, the memory cell array 165 can be formed on one or more integrated circuit dies; and the logic circuit of the local media controller 150, the cryptographic engine 107, and the Multiply-Accumulate Unit 167 can be formed on a separate integrated circuit die that is connected to the integrated circuit dies of the memory cell array 165 using Through-Silicon Vias (TSVs) (or another type of inter-chip connections). For example, the logic circuit can be formed using the technique of CMOS (Complementary Metal Oxide Semiconductor) Under the Array (CUA) of memory cells. Alternatively, the technique of CMOS in the Array of memory cells can be used.

Optionally, the Multiply-Accumulate Unit 167 can be implemented using a crossbar array of memristors that perform the Multiply-Accumulate (MAC) operations via analog circuitry. Data elements involved in the multiplication can be written in the memristors to configure the resistances of the memristors. Electric currents going through the wordlines through a set of memristors in the crossbar array to a bitline are summed in the bitline, which corresponds to the accumulation operation. The electric currents correspond to the multiplication of the voltages applied on the wordlines and parameters associated with the resistances of the memristors, which corresponds to the multiplication operations. The currents in the bitlines can be measured to obtain the results of multiplication and accumulation. Alternatively, a logic circuit can be used to perform the Multiply-Accumulate (MAC) operations.

The proof of space manager 113 can be at least in part firmware stored in the memory cell array 165 and executed in the local media controller 150. The computations of the proof of space manager 113 can be programmed to be accelerated via the cryptographic engine 107 and the multiply-accumulate unit 167.

Optionally, a host system 120 connected to a memory sub-system 110 having the integrated circuit memory device 130 can send commands through the communication interface 147 to pre-process data stored in the memory cell array 165 using the multiply-accumulate unit 167 and/or the cryptographic engine 107 to generate data to be retrieved from the integrated circuit memory device 130.

In some implementations, the communication interface 147 includes a PCIe interface supporting NVMe protocol for communication with a host system 120. Alternatively, other interfaces and/or protocols (e.g., universal serial bus (USB), Serial Attached SCSI (SAS), Compute Express Link (CXL)) can be used.

Figure 7:
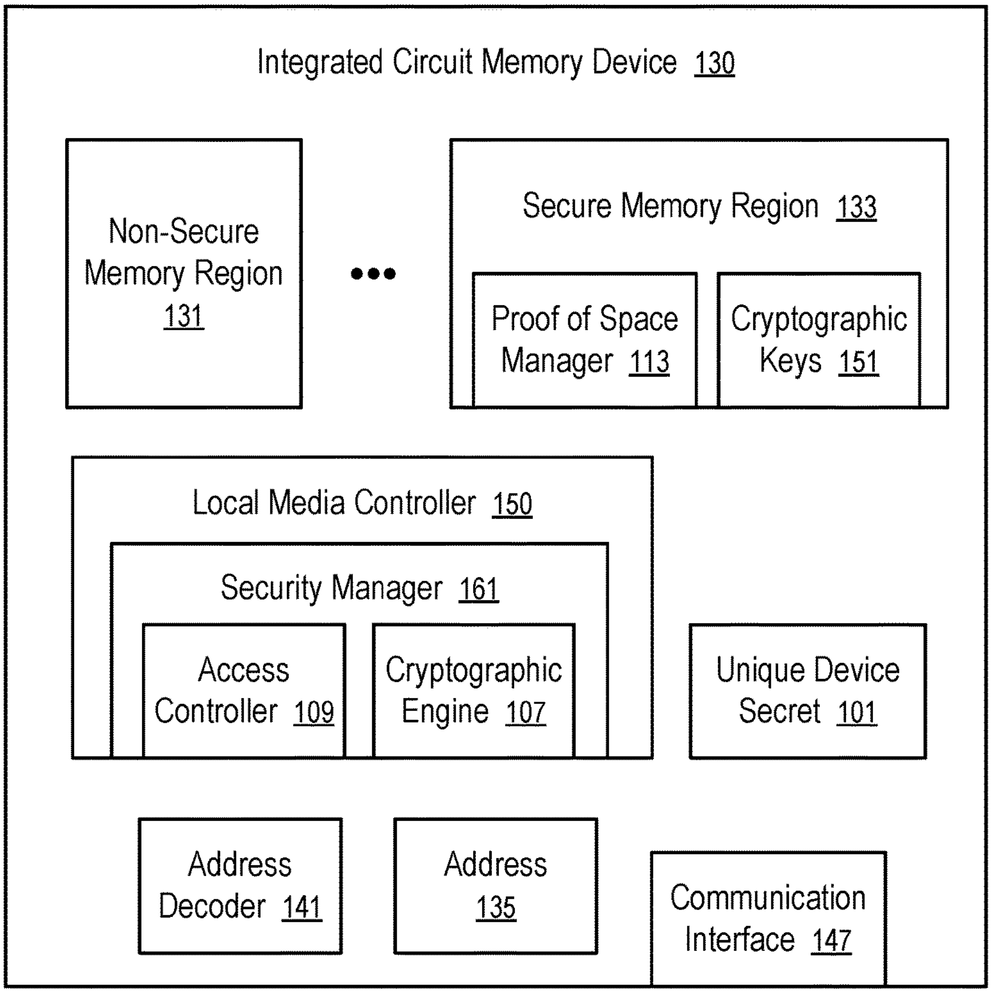
FIG. 7 shows an integrated circuit memory device configured to secure a proof of space manager according to according to one embodiment.

Optionally, the cryptographic engine 107 is further used to implement a security manager 161, as in FIG. 7, to protect the integrity of data in the memory cell array 165. The protected data can include the firmware of the memory device 130 and/or a memory sub-system 110 having the memory device 130, and/or the operating system and software of a host system 120 connected to the memory sub-system 110, as further discussed in connection with FIG. 7.

The host data 207 can include configuration data 203 for the internal host 201 implemented via the firmware to generate the plot 209, and/or to farm the plot 209 in the cryptocurrency network 217.

Figure 6:
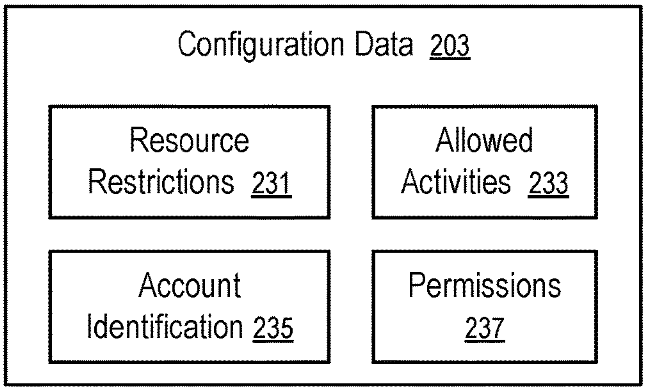
FIG. 6 shows an example of configuration data to control proof of space activities according to one embodiment.

FIG. 6 shows an example of configuration data to control proof of space activities according to one embodiment. For example, the configuration data 203 of the internal host 201 of FIG. 2 can be implement in a way as illustrated in FIG. 6.

In FIG. 6, the configuration data 203 includes resource restrictions 231, allowed activities 233, account identification 235, permissions 237, etc.

For example, resource restrictions 231 can specify a limit on the percentage of the storage capacity 205 of the memory sub-system 110 that is allowed to be used by the proof of space manager 113 to store one or more plots 209.

For example, resource restrictions 231 can specify a limit on the percentage of the computing resources of the memory sub-system controller 115 that can be used by the internal host 201.

For example, resource restrictions 231 can specify a limit on data access bandwidth to the storage capacity 205 that is allowed to be used by the internal host 201.

For example, resource restrictions 231 can specify a limit on program-erase budget of the storage capacity 205 that is allowed to be used by the internal host 201.

When an activity (e.g., plot generation, plot farming) is explicitly specified as one of the allowed activities 233, the proof of space manager 113 can perform the activities 233 when connected to the network interface 215 and/or the cryptocurrency network 217. Otherwise, a portion of the internal host 201 and/or the proof of space manager 113 is blocked to prevent the activity that is not included in the allowed activities 233.

The configuration data 203 can include account identification 235 associated with an account in the cryptocurrency network 217 and/or the plot 209. For example, the account identification 235 can include a cryptographic key used to represent an owner of the account and/or as part of an initial data to generate the plot 209.

The permissions 237 in the configuration data 203 can specify whether and/or when the internal host 201 can operate autonomously. For example, the permissions 237 can be configured to indicate that the internal host 201 is permitted to start operation after receiving an explicit request from the host system 120. For example, the permissions 237 can be configured to indicate that the internal host 201 can operate autonomously when the host system 120 is inactive but cannot operate when the host system 120 is active. For example, the permission 237 can be configured to indicate that internal host 201 can operate whenever the internal host 201 can access the cryptocurrency network 217.

For improved security, the proof of space manager 113 and/or the internal host 201 can be implemented via a secure memory device as illustrated in FIG. 7.

FIG. 7 illustrates an integrated circuit memory device having a security manager according to one embodiment. For example, the memory device of FIG. 7 can be used to implement the internal host 201 of FIG. 2 via firmware.

The integrated circuit memory device 130 can be enclosed in a single integrated circuit package. The integrated circuit memory device 130 includes multiple memory regions 131, . . . , 133 that can be formed in one or more integrated circuit dies.

A typical memory cell in a memory region (e.g., 131, . . . , 133) can be programmed to store one or more bits of data.

The memory device 130 has a local media controller 150, which can implement at least a portion of a security manager 161.

The security manager 161 of the memory device 130 can include an access controller 109 and a cryptographic engine 107.

The cryptographic engine 107 can be implemented via a logic circuit and/or instructions or microcode to perform cryptographic calculations, such as applying a cryptographic hash function to a data item to generate a hash value, encrypting a data item to generate cipher text using a cryptographic key, decrypting cipher text to recover a data item using a corresponding cryptographic key, generating a cryptographic key of symmetric cryptography and/or a pair of cryptographic keys of asymmetric cryptography, etc.

The access controller 109 controls access to at least one of the memory regions 131, . . . , 133 and/or other functions of the memory device 130 based on cryptographic keys that are representative of access privileges.

For example, the security manager 161 can control access to a secure memory region 133 based on a cryptographic key that is generated based on a secret 101 of the integrated circuit memory device 130 and/or a cryptographic key representative of an owner or an authorized user of the memory device 130. For example, when a request or command to write data into the secure memory region 133 is received in the integrated circuit memory device 130, the security manager 161 verifies whether the request is from a requester having the cryptographic key. If no, the security manager 161 may reject the write request. To demonstrate that the request is from an authorized requester, the requester can digitally sign the request, or a challenge message, using the cryptographic key. When the security memory device 130 determines that the digital signature is made using the correct cryptographic key, the requester is seen to have the permission to write the data into the secure memory region 133. For example, the memory device 130 can store a cryptographic key 151 that is used to authenticate the digital signature of the signed request/command.

The memory device 130 can be configured to use different cryptographic keys 151 to access control different commands. For example, one cryptographic key 151 can be representative of the privilege to have a security command executed in the memory device 130; and the security command is used to specify that another cryptographic key 151 is representative of the privilege to read and/or write in a secure memory region 133. For example, the memory device 130 can have multiple secure memory regions (e.g., 133); and access to each of the secure memory regions (e.g., 133) can be controlled via a separate cryptographic key 151.

For example, the memory device 130 can have a unique device secret 101 that represents an identity of the memory device 130; and a cryptographic key 151 derived from the unique device secret 101 can be representative of an owner privilege to operate the memory device 130 and thus have security commands executed in the memory device.

In general, the secure memory region 133 can have different security requirements for different types of accesses (e.g., read, write, erase). For example, the secure memory region 133 can be configured to require digital signatures verifiable via the cryptographic key 151 to write or change data in the secure memory region 133 but does not require a signed command to read the data from the secure memory region 133. Alternatively, the secure memory region 133 can be configured to require digital signatures verifiable via the cryptographic key 151 to read, write, and/or change data in the secure memory region 133. Alternatively, the secure memory region 133 can be configured to require digital signatures verifiable via different cryptographic keys for different operations, such as read, write, change, erase, etc., in the secure memory region 133.

The integrated circuit memory device 130 has a communication interface 147 to receive a command having an address 135. In response to the address 135 identifying a secure memory region (e.g., 133) that is configured with access control, the security manager 161 uses the cryptographic engine 107 to perform cryptographic operations for the verification that the request is from a requester having the cryptographic key authorized for the access to the memory region 133, before providing memory data retrieved from the memory region 133 using an address decoder 141. The address decoder 141 of the integrated circuit memory device 130 converts the address 135 into control signals to select a group of memory cells in the integrated circuit memory device 130; and the local media controller 150 of the integrated circuit memory device 130 performs operations to determine the memory data stored in the memory cells at the address 135.

In FIG. 7, the firmware (e.g., instructions and data) of the proof of space manager 113 is stored in the secure memory region 133. Thus, unauthorized modification of the proof of space manager 113 can be prevented. Further, a cryptographic measurement of the firmware (e.g., a value computed by applying a cryptographic hash function on the firmware) can be stored in the memory device 130. Before the firmware is loaded and/or used (e.g., by the memory sub-system controller 115 to implement the internal host 201), the memory device 130 can validate the integrity of the firmware by comparing the current cryptographic measurement of the firmware and a stored measurement for the firmware. Thus, when the firmware is corrupted and/or tampered with, the memory device 130 can detect the corruption and prevent the use of the corrupted firmware.

Figure 8:
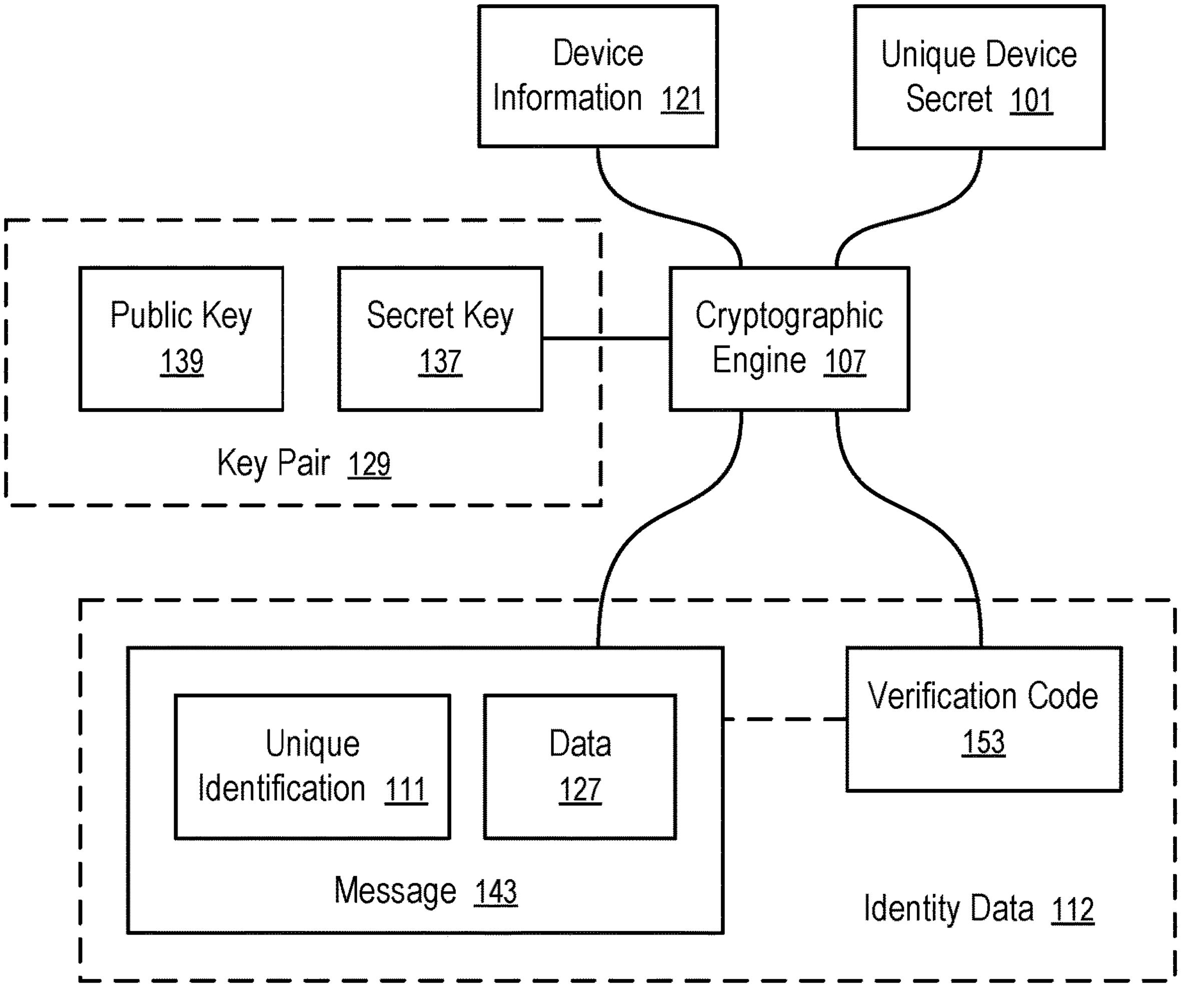
FIG. 8 illustrates the generation of identity data in an integrated circuit memory device according to one embodiment.

FIG. 8 illustrates the generation of identity data in an integrated circuit memory device according to one embodiment. For example, the technique of FIG. 8 can be implemented in the memory device 130 of FIG. 7.

In FIG. 8, the cryptographic engine 107 of a memory device 130 (e.g., as in FIG. 1) is used to generate at least a secret key 137 using its unique device secret 101 and device information 121.

For example, when asymmetric cryptography is used, the secret key 137 is a private key of a cryptographic key pair 129. An associated public key 139 is generated together with the private key using the cryptographic engine 107.

Alternatively, when symmetric cryptography is used, the secret key 137 can be generated and used without a public key 139 and without the key pair 129.

In some implementations, multiple key pairs 129 are generated and used. For example, when a method of Device Identity Composition Engine (DICE) and Robust Internet-of-Things (RIoT) is used, a first pair of asymmetric keys is referred to as device identification keys; and a second pair of asymmetric keys is referred to as alias keys. The private device identification key can be used to certify the authenticity of the alias keys and then immediately deleted and purged from the memory device 130 and to safeguard its secrecy, especially when the generation or use of the private device identification key occurs at least in part in the host system 120. The alias keys can be used in authentication in further transactions and/or communications. For example, the private device identification key can be generated at a boot time and used to sign certificates, such as a certificate of the alias public key, and then deleted. After the identity of the memory device 130 and the authenticity of the public alias key are validated or confirmed using the certificates signed using the private device identification key as the secret key 137, the private alias key can then be used as the secret key 137 of the memory device 130 in subsequent operations, until the host system 120 reboots.

For example, the device information 121 can be based on a set of instructions (e.g., software, firmware, operating system, application) to be executed by the processing device 118 of the host system 120 and/or the processing device 117 of the memory sub-system controller 115.

For example, the device information 121 can include a cryptographic hash value of the set of instructions. For example, a known hash value of the set of instructions can be stored in the memory cells; and the current hash value of the set of instructions can be computed for comparison with the known hash value. If the two hash values agree with each other, the integrity of the set of instructions is verified; and the hash value of the integrity of the set of instructions can be used as part of the device information 121 to compute the secret key 137.

Alternatively, the current hash value of the set of instructions stored in the memory cells can be used directly in the calculation of the secret key 137. If the instructions have changed (e.g., due to data corruption and/or tampering or hacking), the validation of the secret key 137 by a security server will fail.

Optionally, the device information 121 can include an identification of the set of instructions, such as a hash value of the source code of the instructions, a name of the software/firmware package represented by the instructions, a version number and/or a release date of the package, etc.

Optionally, the device information 121 can include trace data stored into the memory cells during the process of building and/or customizing the computing system having the host system 120 and the memory device 130. For example, when the memory device 130 is assembled into a component device (e.g., a memory sub-system), a piece of trace data representative of the manufacturer of the component device, the model of the component device, and/or the serial number of the component device is stored into the memory cells as part of the device information 121. Subsequently, when the component device is assembled into the computing system, a piece of trace data is added into the memory cells as part of the device information 121. Further trace data can be added to the memory cells as part of the device information 121 to reflect the history of the memory device 130 for the individualization of the identity of the memory device 130.

Optionally, the device information 121 can further include data received from the host system 120 to which the communication interface 147 of the memory device 130 is connected.

For example, the computing system can have at least the host system 120 and the memory device 130. Some of the components in the host system 120 may be removed or replaced. At the time of booting up the host system 120, a portion of the instructions stored the memory cell is executed to collect data about the components that are present in the host system 120 at the boot time. Thus, the device information 121 can represent a particular configuration of software/data and hardware combination of the memory device 130 and/or the host system 120. The secret key 137 generated based on the device information 121 and the unique device secret 101 represent the identity of the memory device 130 with the particular configuration.

To demonstrate the identity of the memory device 130 and/or the host system 120, the cryptographic engine 107 generates a verification code 153 from a message 143 and the secret key 137.

The verification code 153 of the secret key 137 and the message 143 can be constructed and/or validated using various techniques, such as hash digest, a digital signature, or a hash-based message authentication code, symmetric cryptography, and/or asymmetric cryptography. Thus, the verification code 153 is not limited to a particular implementation.

In general, verifying whether a sender of a message (e.g., 143) has a cryptographic key (e.g., 145) involves the validation of a verification code (e.g., 153) of the message (e.g., 143). The verification code can be in the form of a hash digest, a digital signature, a Hash-based Message Authentication Code (HMAC), a Cipher-based Message Authentication Code (CMAC), etc. The verification code is generated using the cryptographic key and the message as an input to cryptographic operations such as hashing, encrypting, and/or other computations such that it is generally impractical to generate the verification code without the cryptographic key and to generate the verification code from modified version of the message. Thus, when the recipient confirms that the received verification code is valid for the received message and a cryptographic key, the recipient can conclude that the sender has the corresponding cryptographic key and the received message is the same as the message used to generate the received cryptographic key.

In some implementations, the recipient performs the validation of a verification code of a message using the same cryptographic key as used by the sender to generate the verification code. For example, the recipient uses the same cryptographic key to generate the verification code of the received message and compare the generated verification code with the received verification code. If there is a match, the received verification code is valid for the received message; and the sender can be considered to have the cryptographic key. Otherwise, the received verification code is invalid for the received message; either the received message has been changed since the generation of the verification code, or the received verification code was generated using a different cryptographic key, or both.

In some implementations, the recipient performs the validation of a verification code of a message using a public cryptographic key in a key pair; and the sender generates the verification code using a private cryptographic key in the key pair. For example, the verification code can be generated by applying a hash function to the message to generate a hash value of the message. The cipher text of the hash value obtained through encrypting the hash value performed using an encryption key can be used as the verification code. A recipient of the message and the verification code performs validation using a corresponding decryption key, which is the same as the encryption key when symmetric cryptography is used and is a different key in a key pair when asymmetric cryptography is used. After recovering a hash value from the cipher text using the decryption key, the recovered hash value can be compared to the hash value of the received message; if there is a match, the received verification code is valid for the received message; otherwise, the received verification code is invalid for the received message. Alternatively, the recipient can use the encryption key to perform the validation without performing decryption. The recipient can generate the verification code of the message using the encryption key for comparison with the received verification code.

In some implementations, a message and a cryptographic key is combined to generate a hash value as the verification code, as in a technique of Hash-based Message Authentication Code (HMAC). For example, a cryptographic key can be used to generate two keys. After combining one of the two keys with the message to generate a message modified by the key, a cryptographic hash function can be applied to the key-modified message to generate a hash value, which is further combined with the other key to generate a further message. After applying the cryptographic hash function (or another cryptographic hash function) to the further message, a hash-based message authentication code is generated. A recipient of the message can use the same cryptographic key to generate the hash-based message authentication code of the received message for comparison with the received hash-based message authentication code. If there is a match, the validation is successful; otherwise, the validation fails.

In general, any techniques for generating and validating a verification code for a message from a sender and a cryptographic key used by the sender to generate the verification code can be used to determine whether the sender has the cryptographic key. The recipient is to use an appropriate cryptographic key to perform the validation, which can be the same as the cryptographic key used to generate the verification code, or in the same pair of asymmetric cryptographic key. Thus, the present disclosure is not limited to a particular technique of hash digest, digital signature, and/or hash-bashed message authentication code.

For convenience, a verification code (e.g., 153) generated for a message (e.g., 143) using a cryptographic key (e.g., 145) to represent both the message (e.g., 143) and the cryptographic key (e.g., 145) can be referred to, generally, as a digital signature of the message (e.g., 143) signed using the cryptographic key (e.g., 145), with the understanding that the verification code can be generated using various techniques, such as hash-based message authentication code.

Optionally, the message 143 can include a user identification, such as a name, an email address, a registered username, or another identifier of an owner or authorized user of the host system 120 in which the identity data 112 is generated.

Optionally, part of the message 143 can provide information in an encrypted form. For example, the information can be encrypted using a public key of the security server such that the information is not accessible to a third party.

The message 143 can be a certificate presenting the unique identification 111 of the memory device 130 and/or the host system 120. The message 143 can further present other data 127, such as a counter value maintained in the memory device 130, a cryptographic nonce, and/or other information related to the validation of the identity data 112. The memory device 130 can monotonically increase the counter value to invalidate identity data that have lower counter values to prevent replay attacks.

In some implementations, the data 127 can include part of the device information 121 used to generate the secret key 137.

In some implementations, the secret key 137 is a private alias key in a pair of asymmetric keys. The data 127 includes a certificate presenting the corresponding public alias key in the pair of asymmetric keys. The certificate presenting the public alias key is signed using a device identification key of the memory device 130. The public alias key can be used to validate the verification code 153 for the message 143 and the private alias key that is used as the secret key 137. Once the security server validates the certificate presenting the public alias key, signed using the device identification key of the memory device 130 and provided as part of the data 127, the security server can use the public alias key to validate the verification code 153 signed using the private alias key as the secret key 137. In such an implementation, the security server can use the public alias key provided in the message 143 to validate the verification code 153 without having to regenerate the pair of alias keys; and the memory device 130 can generate the alias key pair 129 using data not known to the security server.

The certificate presenting the public alias key can be generated and validated in a way as in FIG. 8, where the secret key 137 is the device identification key generated using the device information 121 and the unique device secret 101. Optionally, the memory device 130 initially provides the security server with the certificate having the public alias key. Subsequently, the memory device 130 can use the private alias key as the secret key 137 without including the public alias key in the message 143, or without including the certificate of the public alias key in the message 143.

Further, the verification of the identity of the memory device 130 can include the use of multiple secret keys and verification codes signed using the secret keys. For example, a device identification secret key can be used to initially establish the authenticity of an alias secret key and the identity of the memory device 130; and subsequently, the alias secret key can be used to validate the authenticity of the identity of the memory device 130. In general, the device identification secret key and the alias secret key can be based on asymmetric cryptography or symmetric cryptography, since the security server can generate the corresponding cryptographic keys generated by the memory device 130.

For improved security, the memory device 130 does not use the processing power outside of the memory device 130 to generate its copy of the secret key 137 and does not communicate the secret key 137 outside of the memory device 130. The generation and use of the secret key 137 are performed using the logic circuit of the cryptographic engine 107 sealed within the memory device 130.

Alternatively, part of operations to generate and use the secret key 137 can be implemented via a set of instructions stored in the memory cells and loaded into the processing device 118 of the host system 120 for execution. For improved security, the secret key 137 is not communicated across the communication interface 147 in clear text; and the instructions can be configured to purge the secret key 137 from the host system 120 after the generation and/or after the use.

The identity data 112 can be generated in response to the memory device 130 being powered up, in response to a request received in the communication interface 147, and/or in response to the host system 120 boots up (e.g., by executing a boot-loader stored in the memory cells). The data 127 can include a count value maintained in the memory device 130. The count value increases when the operation to generate the identity data 112 is performed. Thus, a version of the identity data 112 having a count value invalidates prior versions of the identity data 112 having count values lower than the count value.

Figure 9:
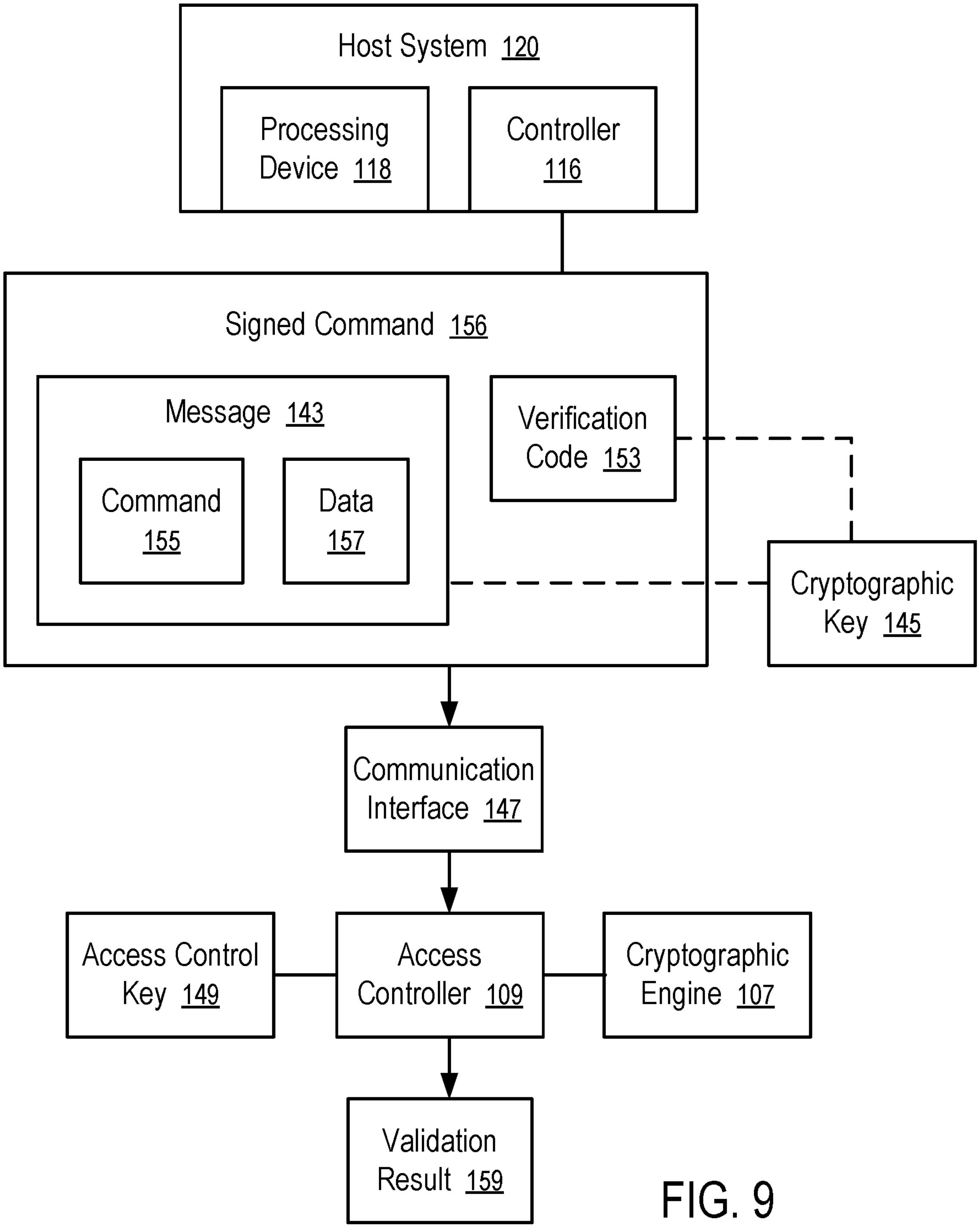
FIG. 9 illustrates a technique to control execution of a command in a memory device according to one embodiment.

FIG. 9 illustrates a technique to control execution of a command in a memory device according to one embodiment. For example, the technique of FIG. 9 can be implemented in the memory device 130 of FIG. 7.

In FIG. 9, the access controller 109 is configured with an access control key 149 to determine whether a signed command 156 received in the communication interface 147 is from an entity having the privilege to have the command 155 executed in the secure memory device 130.

When a controller 116 of a host system 120 sends a command 155 to the communication interface 147 of the memory device 130, the access controller 109 determines whether the sender of the command 155 has the privilege to request the memory device 130 to execute the command 155. The host system 120 can include one or more processing devices 118 that execute instructions implementing an operating system and/or application programs.

A cryptographic key 145 is configured to represent the privilege that is to be checked using the access control key 149. A sender of the command 155 can generate a verification code 153 from the cryptographic key 145 and a message 143 containing the command 155.

Similar to the verification code 153 discussed above in connection with FIG. 8, the verification code 153 of the cryptographic key 145 and the message 143 can be constructed and/or validated using various techniques, such as hash digest, a digital signature, or a hash-based message authentication code, symmetric cryptography, and/or asymmetric cryptography. Thus, the verification code 153 is not limited to a particular implementation; and the verification code 153 can be referred to, generally, as a digital signature of the message 143 signed using the cryptographic key 145, with the understanding that the verification code 153 can be generated using various techniques, such as hash-based message authentication code.

In FIG. 9, the access controller 109 uses a corresponding access control key 149 to validate the verification code 153 submitted to the communication interface 147 for the command 155. The access controller 109 uses the cryptographic engine 107 to generate a validation result 159 of the received message 143 and the received verification code 153. Based on the validation result 159, the access controller 109 can selectively allow the command 155 to be executed within the memory device 130 or block the execution of the command 155.

For example, the access control key 149 can be one of the cryptographic keys 151 stored in the memory device 130. Different access control keys can be used to control different privileges for executing different commands and/or for executing a command operating on different sections or regions of memory cells.

For example, one cryptographic key 145 can be representative of the privilege to have a security command executed in the memory device 130. When the security command is executed, an access control key 149 is installed (or uninstalled) in the memory device 130 for the validation of a verification code of another cryptographic key representative of the privilege to have a read command (or a write command) executed to access the secure memory region 133.

Optionally, the cryptographic key 145 is generated in the process of validating the identity of the memory device 130 based on the unique device secret 101 of the memory device 130; and a secret known between the memory device 130 and an owner of the memory device 130 allows the generation of a session key as the cryptographic key 145 to represent the privileges to have selected commands executed in the memory device 130 during a communication session. The communication session can have a time limit and/or be terminated via a command to the memory device 130.

In some implementations, a same session key used as the cryptographic key 145 representative of a privilege (e.g., to read or write the data in the secure memory region 133) and as the access control key 149 for the validation of verification codes (e.g., 153) generated using the cryptographic key 145.

In another implementations, a pair of cryptographic keys of asymmetric cryptography can be used for the session. The public key in the pair is used as the access control key 149; and the private key in the pair can be used as the cryptographic key 145 representative of the corresponding privilege.

After the installation in the memory device 130 the access control key 149 for the validation of the verification codes (e.g., 153) generated using the cryptographic key 145 representative of the privilege to read or write in the secure memory region 133, the cryptographic key 145 can be used by an authorized entity to generate the signed command 156. The signed command 156 can be transmitted to the communication interface 147 of the memory device 130 by the host system 120. After the access controller 109 validates the verification code 153 in the signed command 156, the access controller 109 allows the memory device 130 to execute the command 155.

The message 143 can include data 157 that represents restrictions on the request to execute the command 155.

For example, the data 157 can include an execution count value maintained within the memory device 130 such that verification codes generated for lower counts are invalidated.

For example, the data 157 can include a cryptographic nonce established for a specific instance of a request to execute the command 155 such that the verification code 153 cannot be reused for another instance.

For example, the data 157 can include a time window in which the verification code 153 is valid.

For example, the data 157 can include the identification of a memory region in which the command 155 is allowed to be executed.

For example, the data 157 can include a type of operations that is allowed for the execution of the command 155 in the memory device 130.

Figure 10:
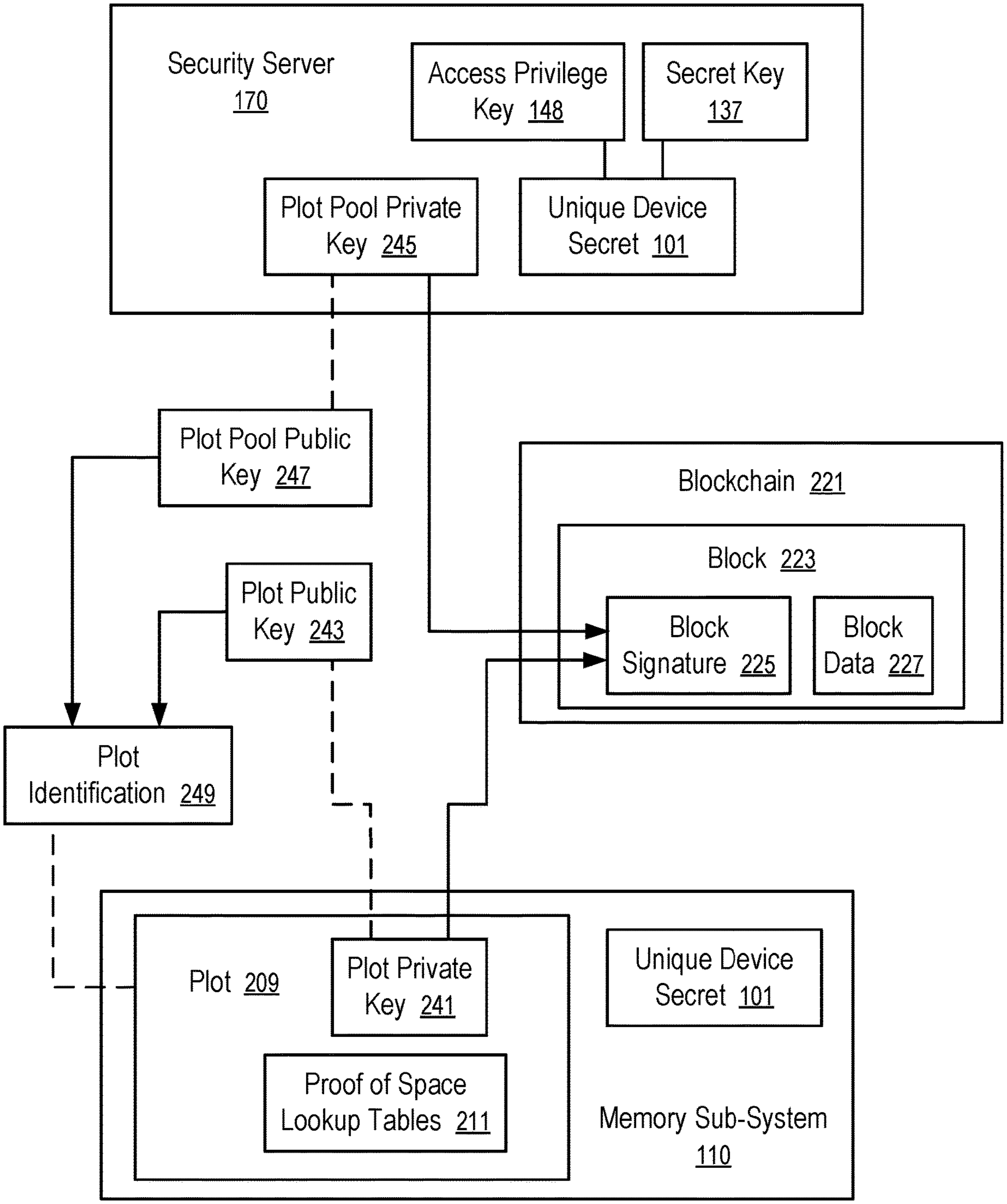
FIG. 10 shows a security server configured to manage plot pools and access to secure memory according to one embodiment.

FIG. 10 shows a security server configured to manage plot pools and access to secure memory according to one embodiment.

For example, the memory sub-system 110 of FIG. 10 can be implemented using the memory sub-system 110 of FIG. 1 to FIG. 4, and/or using the integrated circuit memory device 130 of FIG. 5 and/or FIG. 7.

In FIG. 10, an identification 249 of a plot 209 is based on a combination of a plot private key 241 representative of the plot 209 individually, and a plot pool private key 245 representative of a pool of plots containing the plot 209. The plot private key 241 have a corresponding plot public key 243 usable to verify the digital signatures created using the plot private key 241 according to asymmetric cryptography; and the plot pool private key 245 has a corresponding plot pool public key 247 usable to verify the digital signatures created using the plot pool private key 245 according to asymmetric cryptography.

For example, the plot identification 249 can be based on a hash of the plot pool public key 247 and the plot public key 243; and the plot 209 can be generated based on the plot identification 249 and/or the pair of plot keys 241 and 243 and the pair of plot pool keys 245 and 247. After the plot 209 is generated, the plot pool to which the plot 209 belongs may not be changed; and the plot 209 cannot be reassigned to a different plot pool.

The plot 209 can include the plot private key 241, in addition to the proof of space lookup tables 211. The plot private key 241 can be used to sign a block 223 in a blockchain 221 after the plot 209 is used to generate a successful response to a proof of space challenge. To be valid the block 223 is to be further signed using the plot pool private key 245. In some implementations, multiple blocks in the blockchain 221 created via pools in the pool represented by the plot pool private key 245 can share a digital signature signed using the plot pool private key 245.

For example, to record block data 227 in a blockchain 221, a block signature 225 is created by using the plot private key 241 and the plot pool private key 245 to sign a combination of the block data 227 and data representative of one or more blocks recorded before the block 223. For example, the block data 227 can include a cryptographic hash of blocks recorded in the blockchain 221 before the block 223. Thus, tampering of the blockchain 221 can be detected and rejected via digital signature verification performed using the plot pool public key 247 and the plot public key 243.

In FIG. 10, a security server 170 stores the plot pool private key 245 for a pool of plots created in memory sub-systems (e.g., 110) having unique device secrets (e.g., 101) built into the memory sub-systems (e.g., 110). The plot pool private key 245 is secured in the security server 170, which is configured to sign blocks (e.g., 223) recorded via plots (e.g., 209) in the pool represented by the plot pool private key 245.

Optionally, a user of the cryptocurrency network 217 may choose to configure their plots in the plot pool represented by the plot pool private key 245. Thus, the use of a security memory device (e.g., 130) in plot generation is not required.

The security server 170 can be configured to sign a block 223 in a way similar to sign a command 155 as in FIG. 9. For example, the security server 170 has an access privilege key 148 stored in association with the unique device secret 101 of a secure memory device 130. The access privilege key 148 represents a privilege of an entity to access a secure memory region 133. When a command 155 is signed using the access privilege key 148, the access controller 109 of the secure memory device 130 can validate the verification code 153 using the corresponding access control key 149 and allow the command 155 to be executed within the secure memory device 130.

For example, the security server 170 can include a key management server configured to store the plot pool private key 245, the access privilege key 148, and/or other cryptographic keys, such as the secret key 137 representative of the identity of the secure memory device 130.

To generate the plot 209 in the memory sub-system 110, the plot 209 can be configured to be in a plot pool represented by the plot pool private key 245. Optionally, the plot private key 241 can be generated (e.g., by the memory device 130 or the security server 170) based at least in part on the unique device secret 101. For example, the security server 170 can generate the pair of plot keys (241 and 243) and communicate the plot keys to the memory sub-system 110 for plot generation (e.g., using Key Per IO (KPIO)).

Optionally, the security server 170 can configure plots generated using a same memory sub-system 110 in a same plot pool (e.g., while the memory device 130 is owned by a same entity); plots generated using different memory sub-systems are configured in different plot pools; and plots generated via the same memory sub-system 110 while the memory device 130 is owned by different entities can be configured in different plot pools. For example, each unique device secret 101 can be associated with one or more plot pool private keys (e.g., 245) to represent the one or more pools of plots generated on the memory sub-system 110 having the unique device secret 101 (e.g., under different ownership, or for different plots that are configured with a one plot per pool configuration).

Optionally, the security server 170 can configure plots generated using memory sub-systems (e.g., 110) owned by a same entity in a same plot pool; and the plots generated using memory sub-systems owned by different entities in different plot pools. Thus, each unique identifier of owners of memory sub-systems 110 can be associated with a unique plot pool private key 245 to represent a pool of plots generated by the memory sub-systems (e.g., 11) of the respective owner. When the memory sub-systems (e.g., 110) are initially owned by a manufacturer of memory sub-systems (e.g., 110), the plots generated using the memory sub-systems (e.g., 110) can be placed in a plot pool associated with the manufacturer.

Optionally, the security server 170 can generate a pool for each individual plot (e.g., 209) to allow different combinations of plots to be subsequently transferred to any users in an arbitrary way.

Optionally, a pool in which the plot 209 is to be generated can be identified via the configuration data 203; and a user of the memory sub-system 110 can request the security server 170 to create a pool represented by a new plot pool private key 245 and configured the plot 209 to be generated in the pool.

For example, the memory sub-system 110 can be configured, via the configuration data 203 to request the security server 170 to create a plot pool by generating a new pair of plot pool keys 245 and 247. The plot pool public key 247 can be used as an identification of the plot pool. Optionally, the configuration data 203 can include an identification of an existing plot pool (e.g., identified via the plot pool public key 247); and the memory sub-system 110 can generate the plot 209 in the pool represented by the pair of plot pool keys 245 and 247.

Figure 11:
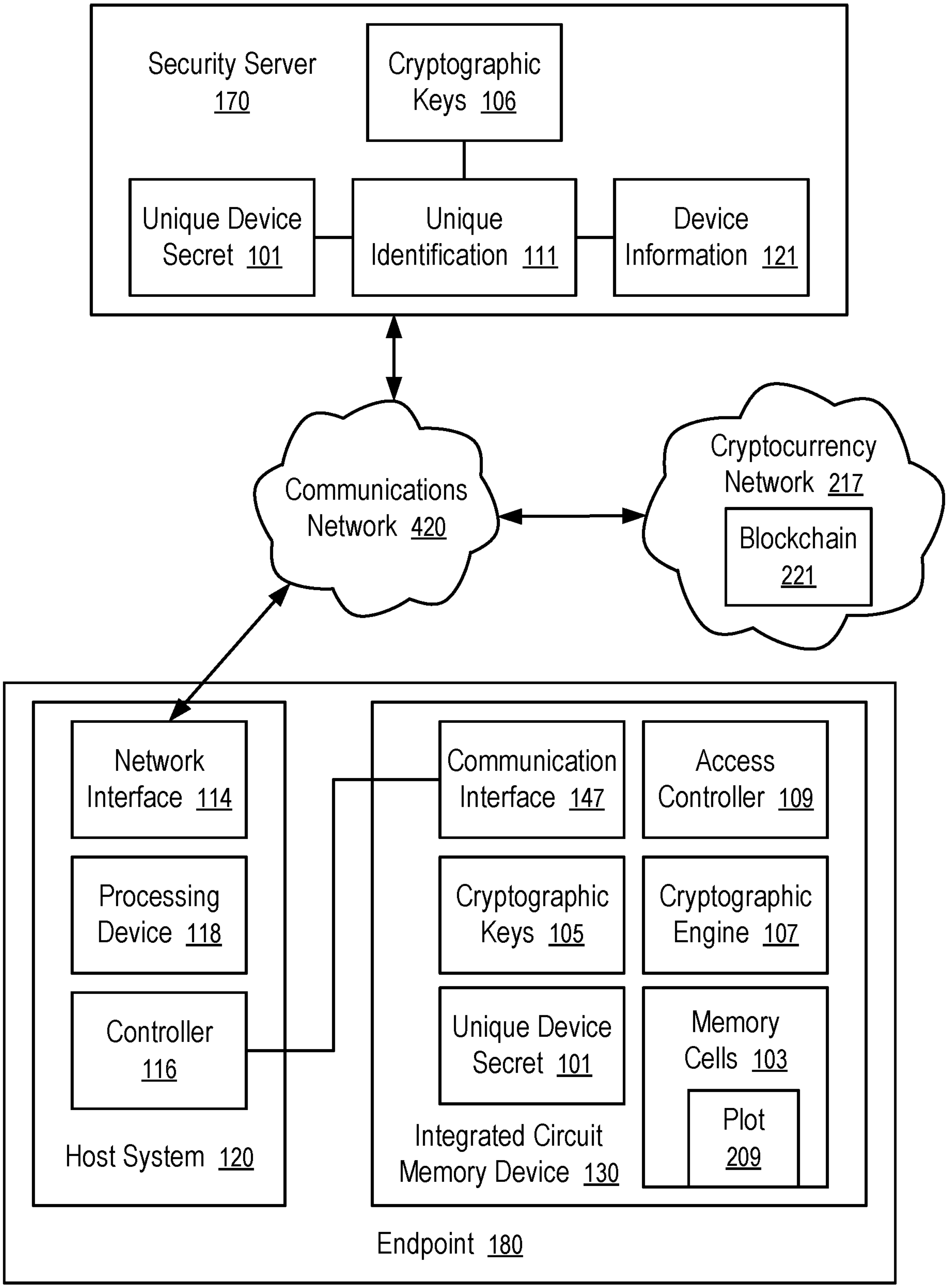
FIG. 11 shows cryptographic key management services according to one embodiment.

FIG. 11 shows cryptographic key management services according to one embodiment.

In FIG. 11, an integrated circuit memory device 130 is installed in an endpoint 180. The endpoint 180 can be a computing device, such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or such a computing device that includes memory and a processing device.

In some implementations, the memory device 130 is configured as a memory sub-system 110 (e.g., as in FIG. 5). In other embodiments, the memory device 130 can be one of components in a memory sub-system 110 (e.g., as in FIG. 1).

In FIG. 11, the memory device 130 can have security features as discussed above in connection with FIG. 7 to FIG. 9.

The secure memory device 130 can store a unique device secret 101 for its authentication. In one example, the unique device secret 101 is injected into the memory device 130 in a secure facility and stored in a register of the memory device 130. In another example, the unique device secret 101 can be obtained from a physical unclonable function (PUF) of the memory device 130. The unique device secret 101 can be obtained and registered in the security server 170 via the secure facility. For example, the secure facility can be part of a manufacturing facilities of memory devices (e.g., 130). After the memory device 130 is manufactured and/or leaves the secure facility, the unique device secret 101 in the memory device 130 is not accessible via any interface (e.g., communication interface 147) to the memory device 130. Thus, after the manufacture of the memory device 130, the unique device secret 101 as in the memory device 130 is sealed in the integrated circuit package of the memory device 130. A copy of the unique device secret 101 is secured within the security server 170 with strong security measures (e.g., use of hardware security module (HSM)) to prevent hacking and unauthorized access.

The memory device 130 includes a logic circuit or local controller that implements a cryptographic engine 107. The cryptographic engine 107 can perform cryptographic computations, such as hashing, key derivation, encrypting, and/or decrypting, without relying upon the processing power outside of the memory device 130, such as a processing device 118 of a host system 120.

For example, according to a method specified by standards for Device Identity Composition Engine (DICE) and Robust Internet-of-Things (RIoT), or another method, cryptographic keys 105 can be generated, at boot time, based on a combination of the unique device secret 101 and device information 121 stored and/or obtained in the memory cells 103 of the memory device 130. The device information 121 can include non-secret data that may be obtained by the entity outside of the security server 170 and the memory device 130. For improved security, the device information 121 can include time related information.

For example, the cryptographic keys 105 can include two pairs of asymmetric cryptographic keys. A first pair of asymmetric keys is referred to as device identification keys; and a second pair of asymmetric keys is referred to as alias keys. The private device identification key is used to certify the authenticity of the alias keys and thus reduces its uses and exposure to risks. The alias keys can be used in more transactions/communications; and the alias keys can be replaced more frequently than the device identification keys to improve security in view of their more frequent uses and thus exposure to risks. For example, the private device identification key can be generated at a boot time and used to sign certificates, such as a certificate of the alias public key; and then the private device identification key is immediately deleted from the memory device 130 to safeguard its secrecy.

In general, one of the cryptographic keys 105 generated using the unique device secret 101 and the device information 121 can be used as a secret and an identity of the memory device 130 to be validated by the security server 170.

Further, the cryptographic keys 105 can include plot pool keys 245 and 247 generated to manage a pool of plots generated in the endpoint 180 and/or in the integrated circuit memory device 130 (or a memory sub-system 110 containing the integrated circuit memory device 130).

Optionally, the security server 170 can further generate the plot keys 243 and/or 241 based on the unique device secret 101. Alternatively, or in combination, the cryptographic engine 107 in the memory device 130 can generate the plot keys 243 and/or 241 based on the unique device secret 101 for the generation of the plot 209. The generation of the plot 209 can be controlled autonomously by an internal host 201 in the integrated circuit memory device 130 or a memory sub-system 110 containing the integrated circuit memory device 130. Alternatively, the generation of the plot 209 can be controlled by the host system 120.

Authentication of the memory device 130 can be performed through the verification that the memory device 130 has the secret cryptographic key 105. Having the secret cryptographic key 105 in the memory device 130 can be considered as evidence that the memory device 130 has the unique device secret 101 and stores an untampered version of non-secret data.

Using the cryptographic engine 107, the memory device 130 can demonstrate that the memory device 130 has the secret cryptographic key 105 without communicating the secret cryptographic key 105 and/or the unique device secret 101 to outside of the memory device 130. For example, the memory device 130 can digitally sign a certificate or message using the secret cryptographic key 105 to provide a verification code of the message and the secret cryptographic key 105. When the security server 170 is successful in validating the verification code, the security server 170 can conclude that the memory device 130 has the secret cryptographic key 105 and thus the identity represented by the unique device secret 101.

The memory device 130 includes a communication interface 147 that can be used to receive commands from a host system 120. A controller 116 of the host system can send commands to the memory device 130 to request reading data from the memory cells 103, to write data into the memory cells 103, to erase data from a portion of the memory cells 103, to modify data in a portion of the memory cells 103, to activate a security feature of the memory device 130, to configure parameters relevant to a security feature in the memory device 130, etc. At least some of the commands requires privileges represented by a cryptographic key 106 stored in the security server 170. Having the cryptographic key 106 available to sign the command is considered an indication of having the privilege to request the memory device 130 to execute the command.

The memory device 130 includes an access controller 109 configured to use the cryptographic engine 107 to validate a verification code generated using a cryptographic key 106 representing the privilege associated with the command. If a command is received with a valid verification code, the access controller 109 allows the memory device 130 to execute the command; otherwise, the command can be rejected, ignored, or discarded.

When the memory device 130 is manufactured, one or more relevant cryptographic keys 105 are stored in the memory device 130 to provide the owner privileges to the security server 170. Using the owner privileges, the security server 170 can sign commands for execution in the memory device 130 to activate or deactivate security features, to trigger the replacement of a secret cryptographic key as the identity of the memory device 130, to replace a cryptographic key used by the access controller 109 in verify privileges to have one or more commands executed in the memory device 130 for one or more regions of the memory cells 103, etc.

Optionally, after authenticating the identity of an authorized requester, the security server 170 can sign a command using a cryptographic key to generate a verification code or digital signature for the command such that the requester can send the command with the verification code to the communication interface 147 of the memory device 130 to cause the command to be executed within the memory device 130.

Optionally, the security server 170 can provide certain privileges to an entity by replacing a cryptographic key 105 in the memory device 130, or to provide a corresponding cryptographic key 106 representative of the privileges to the entity.

Typically, the memory device 130 is connected to a host system 120 to form an endpoint 180 in a communications network 420, such as the Internet. In general, the endpoint 180 is a computing device. Examples of the endpoint 180 include a personal computer, a mobile computer, a personal media player, a tablet computer, a smartphone, a smart TV, a smart speaker, a smart appliance, an IoT (Internet of Things) device, etc.

The memory cells 103 of the memory device 130 can provide the storage/memory capacity for the host system 120 to store instructions and data for the implementation of the functionality of the endpoint 180. For example, the processing device 118 of the host system 120 is configured to execute instructions loaded from the memory device 130 to boot up and perform operations.

The host system 120 can include a network interface 114, or another communication device, to communicate with one or more of client servers to receive services from the client servers.

A request for services sent from the endpoint 180 to a client server can include identity data generated by the cryptographic engine 107 of the memory device 130. The client server can request the security server 170 to validate the verification code included in the identity data.

In addition to the services of authenticating the identity of the memory device 130, the security server 170 can offer security services to manage privileges to operate the memory device 130, to configure or change the security features or settings of the memory device 130, etc.

Further, the security server 170 can offer security services to manage plot pool keys (e.g., 245), to sign blocks (e.g., 223) in a blockchain 221 in a cryptocurrency network 217 using a plot pool private key 245, to secure the transfer of the plot pool private key 245 to an entity farming the plots in the pool represented by the plot pool private key 245, etc., as in FIG. 10.

The memory device 130 and/or the endpoint 180 can have a unique identification 111 that is not a secret. The unique identification 111 can be used to uniquely identify the memory device 130 and/or the endpoint 180 from a population of memory devices and/or endpoints.

For example, the unique identification 111 of the memory device 130 can include a manufacturer part number (MPN) of the memory device 130 and/or a serial number of the memory device 130. For example, the unique identification 111 of the memory device 130 can include a public key in a pair of asymmetric cryptographic keys generated based at least in part on the unique device secret.

To authenticate that the memory device 130 and/or the endpoint 180 has the identity represented by the unique identification 111, the security server 170 validates a message containing the unique identification 111 (and other data 127) via a verification code of the message signed using a secret cryptographic key 105 of the memory device. The secret cryptographic key 105 in the memory device 130 is generated using the unique device secret 101 in the memory device; and the corresponding cryptographic key 106 used to validate a verification code signed using the secret cryptographic key 105 of the memory device 130 is generated in the security server 170 from the corresponding unique device secret 101.

The secret cryptographic key 105 of the memory device 130 used to demonstrate the identity of the memory device 130 can be generated based on not only the unique device secret 101, but also device information 121 accessible to the memory device 130.

For example, the device information 121 can include a hash value of instructions and/or data stored in the memory cells 103. Further, the device information 121 can include trace data stored into the memory cells 103 to personalize/individualize the memory device 130 and/or the endpoint 180 during the assembling of components to build the endpoint 180. Further, the device information 121 can include identification information of other components in the endpoint 180, such as an identification of the controller 116, an identification of the processing device 118, an identification of the network interface 114, an identification of additional software or data package of the endpoint 180 that is not stored in the memory device 130, and/or an identification and/or a hash value of the firmware configured to control/operate the memory device 130. During the boot time, the identification data can be collected as the device information 121 that is used to generate the secret cryptographic key 105 of the memory device 130.

In a registration process when the memory device 130 is configured to have the device information 121, a copy of the device information 121 is uploaded to the security server 170 for association with the unique identification 111 of the memory device 130 and/or the endpoint 180. The registration of the device information 121 allows the identity of the memory device 130 to be linked to the data, software and/or hardware configuration represented by the combination of the unique device secret 101 with the device information 121.

Figure 12:
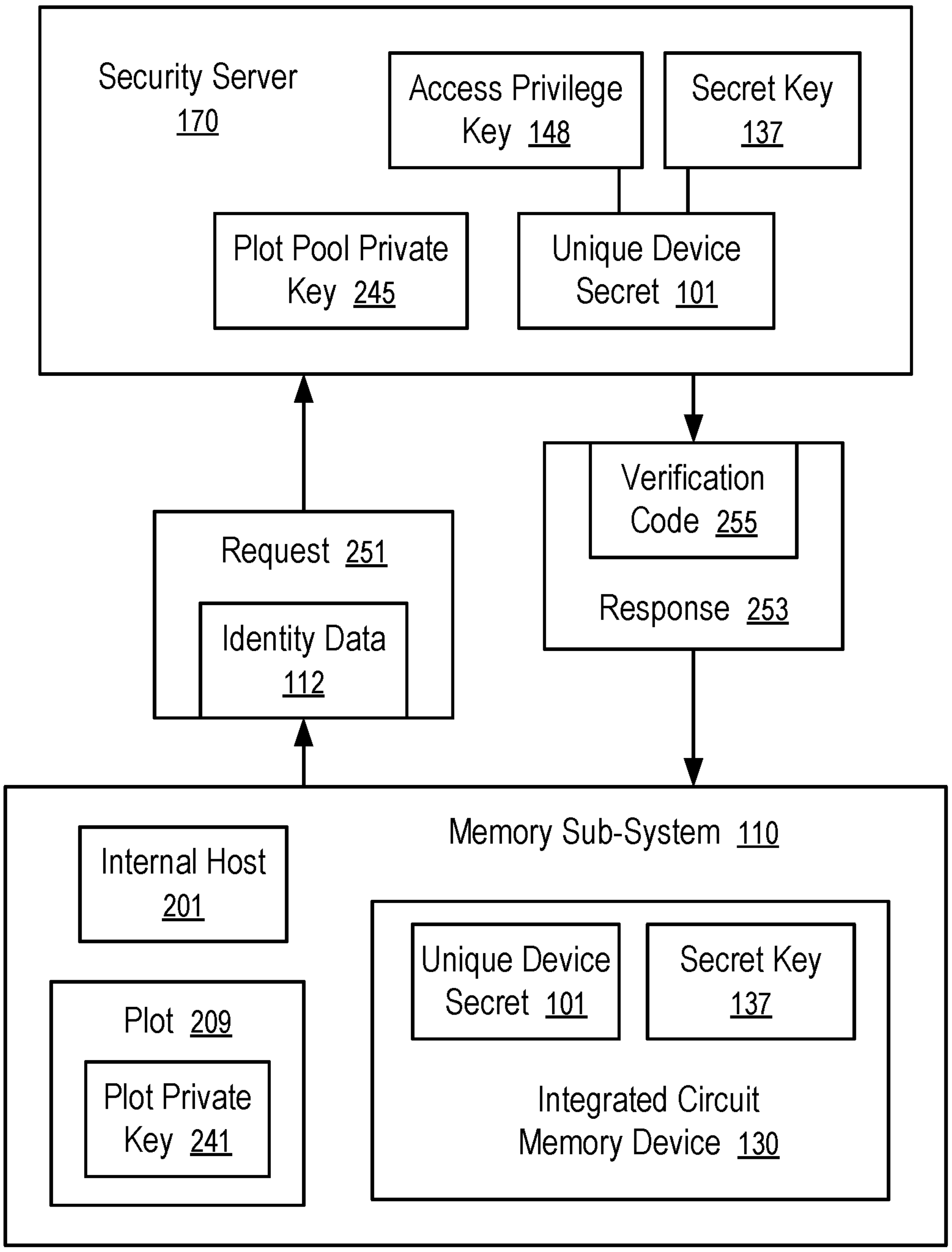
FIG. 12 shows the verification of an identity of a memory sub-system having a proof of space plot according to one embodiment.

FIG. 12 shows the verification of an identity of a memory sub-system having a proof of space plot according to one embodiment.

For example, the verification of FIG. 12 can be implemented using a security server 170 of FIG. 10 and/or FIG. 11, for a memory sub-system 110 having an integrated circuit memory device 130 as in FIG. 10 and/or FIG. 11 for signing a block 223 in a blockchain 221.

In FIG. 12, the memory sub-system 110 has an internal host 201 configured to generate a request 251 to the security server 170. The request 251 can be communicated through a communications network 420 and/or via a peripheral device (e.g., a network interface or a wireless transceiver in communication with an access point or base station).

In some implementations, a host system 120 connected to the memory sub-system 110 can control the transmission of the request 251.

The request 251 is configured to include identity data 112 generated by or via the integrated circuit memory device 130. For example, the technique of generation and validation of the identity data 112 in FIG. 8 can be used. For example, the identity data 112 is generated based on a secret key 137 in the integrated circuit memory device 130; and the secret key 137 is generated based on a unique device secret 101 of the integrated circuit memory device 130.

For improved security, the unique device secret 101 is not retrievable, from outside of the integrated circuit memory device 130, via any interface of the integrated circuit memory device 130 after the manufacturing of the integrated circuit memory device 130; and the secret key 137 is not communicated to outside of the integrated circuit memory device 130. During manufacturing of the integrated circuit memory device 130, the unique device secret 101 is registered into the security server 170; and the security server 170 can independently generate the same secret key 137 of the integrated circuit memory device 130 based on its copy of the unique device secret 101 and other information that can be communicated between the security server 170 and the integrated circuit memory device 130 after the manufacturing of the integrated circuit memory device 130.

For example, the identity data 112 can include a digital signature (e.g., verification code 153) signed by the integrated circuit memory device 130 using the secret key 137. By validating the digital signature, the security server 170 can determine that the request 251 is from the particular integrated circuit memory device 130 that has the unique device secret 101.

After verifying the identity of the integrated circuit memory device 130 that digitally signs the request 251, the security server 170 can generate a response 253 for the request 251. The response 253 can include a digital signature (e.g., a verification code 255) generated by the security server 170. The digital signature can be validated to show that the response 253 is generated for a request 251 signed by an integrated circuit memory device 130 having an identity verified by the security server 170.

For example, the request 251 can include a request for a digital signature signed using a plot pool private key 245 for the plot 209 stored in the memory sub-system 110. In some instances, the plot 209 can be stored at least in part in the integrated circuit memory device 130. For example, the plot private key 241 can be stored in the non-secure memory region 131, or in the secure memory region 133, of the integrated circuit memory device 130. In some implementations, the plot private key 241 is generated by the integrated circuit memory device 130 based on the unique device secret 101.

For example, the request 251 can include a response to a proof of space challenge; and the response can include a digital signature of the security server 170 to attest the authenticity of a memory sub-system 110 having the integrated circuit memory device 130 uniquely associated with a unique device secret 101 among a population of memory devices from a manufacturer.

For example, a cryptocurrency network 217 can be configured to provide one opportunity for each separate plot stored in a unique, identifiable memory device. The request 251 can include the data demonstrating that the plot is stored in the memory sub-system 110 having the integrated circuit memory device 130; and the verification code 255 can attest to the uniqueness of the memory sub-system 110 in a population.

Optionally, the security server 170 can include a server system having multiple servers. For example, a server is configured to verify identities of memory devices (e.g., 130), and another server is configured to manage one or more plot pools. In response to the request 251 (e.g., for a digital signature signed for a plot pool containing the plot 209), the servers in the server system can communicate with each other to verify the identity data 112 and if the identity data 112 is valid, generate the response 253 (e.g., for the plot 209).

Figure 13:
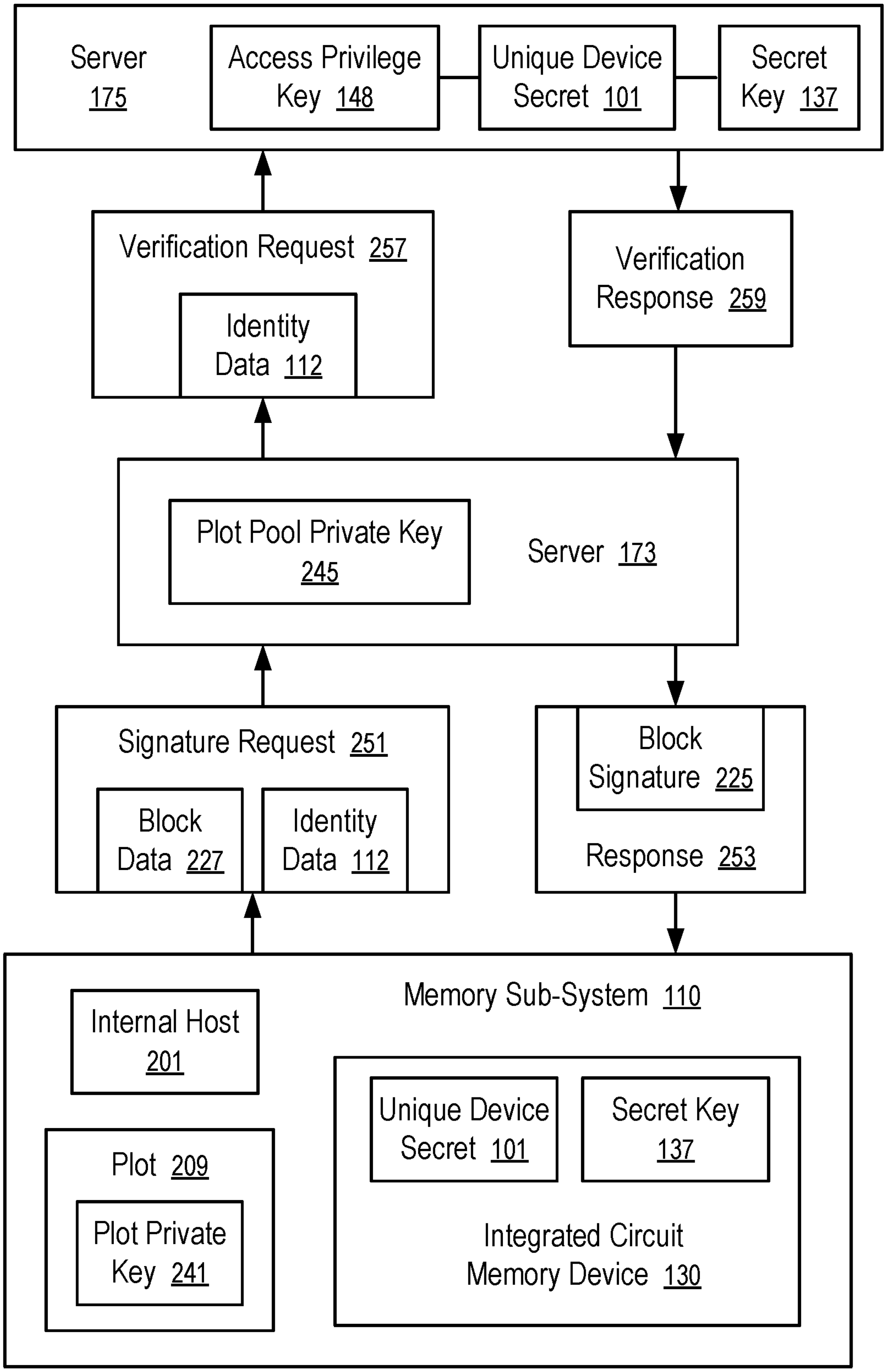
FIG. 13 shows the creation of a block signature based on verification of an identity of a memory sub-system according to one embodiment.

For example, the security server 170 can be implemented using servers 173 and 175 of FIG. 13 in generating a block signature 225 for recording a block 223 in a blockchain 221.

FIG. 13 shows the creation of a block signature based on verification of an identity of a memory sub-system according to one embodiment.

For example, the security server 170 of FIG. 12 can be implemented using servers 173 and 175 for signing a block 223 in a blockchain 221.

In FIG. 13, the integrated circuit memory device 130 can generate an identity data 112 provided in a signature request 251 (or in a session for the signature request) as a credential to request the block signature 225.

The signature request 251 includes block data 227 (or a message to be digitally signed for the block data 227). The signature request 251 includes identity data 112.

When the server 173 having the plot pool private key 245 receives the signature request 251, the server 173 can forward the identity data 112 in a verification request 257 to the server 175 that has the secret key 137 and/or the unique device secret 101 of the integrated circuit memory device 130.

After the server 175 verifies the validity of the identity data 112 using the unique device secret 101 and/or the associated secret key 137, the server 175 can provide a verification response 259.

If the verification response 259 confirms the validity of the identity data 112, the server 173 can generate the block signature 225 using the plot pool private key 245. The valid block signature 225 indicates that the block 223 generated in the blockchain 221 is via a plot 209 stored in a memory sub-system 110 having an authentic integrated circuit memory device 130.

Optionally, the block signature 225 can include the identity data 112, which can be submitted to the server 175 for verification when needed.

Optionally, the verification response 259 can include a digital signature of the server 175 signed using a private key of the server 175. The digital signature of the server 175 can be verified using a public key of the server 175; and the valid digital signature of the server 175 for the block 225 in the blockchain 221 (e.g., provided as part of the block signature 225) can be viewed as evidence that the block 225 is created through the plot 209 stored in an authentic memory sub-system 110 verified by the server 175.

FIG. 13 illustrates an example of creating a block signature 225 based on a plot 209 stored in a memory sub-system 110 having a valid identity represented by the unique device secret 101. The technique can also be used to generate other data items that require the proof of a reserved amount of storage space (e.g., corresponding to the stored proof of space plot 209) in an authentic and/or unique memory sub-system 110, such as submission of winning proofs to a cryptocurrency network for verification as a response to a challenge.

Figure 14:
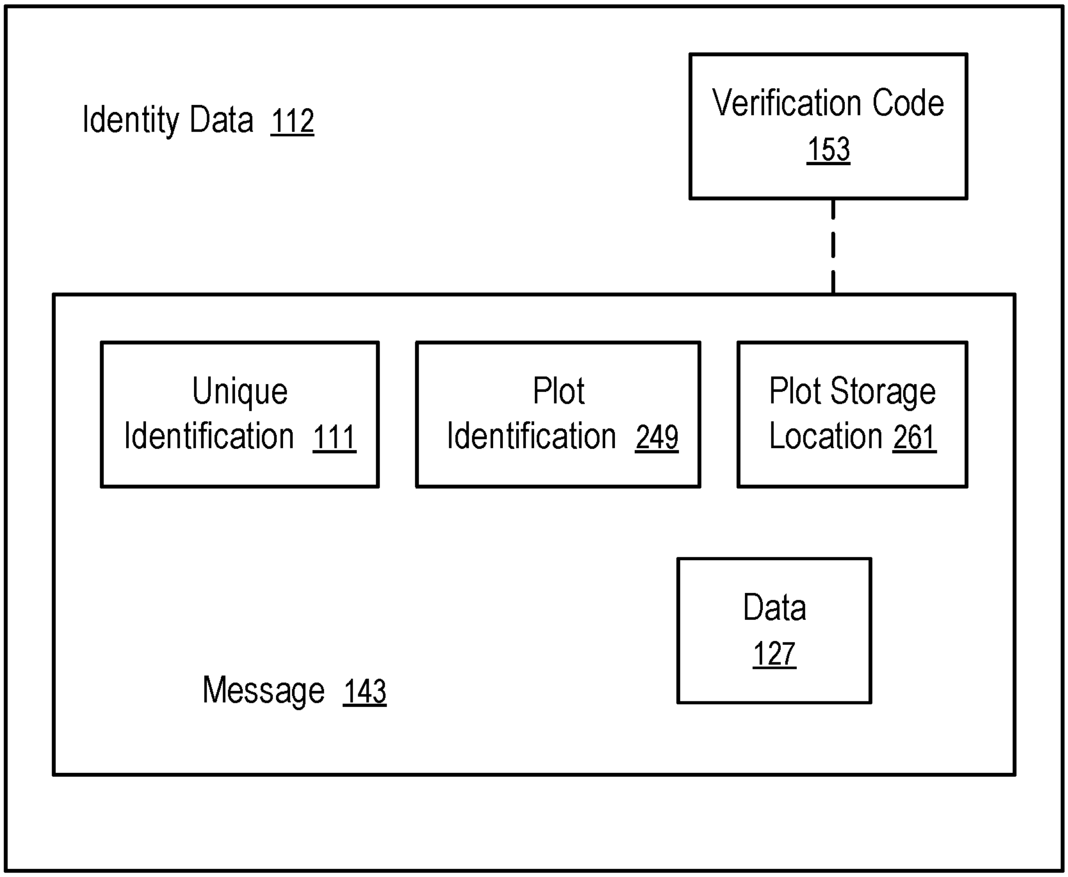
FIG. 14 illustrates identity data of a plot in a memory sub-system according to one embodiment.

FIG. 14 illustrates identity data of a plot in a memory sub-system according to one embodiment.

For example, the identity data of FIG. 14 can be used in the identity verification in FIG. 12 and/or FIG. 13.

In FIG. 14, the identity data 112 includes a message 143 and a digital signature (e.g., verification code 153). The digital signature is generated via a cryptographic combination of a secret key 137 of an integrated circuit memory device 130 and the message 143, in a way similar to the generate of the verification code 153 in FIG. 8.

The message 143 includes a plot identification 249, which can be generated based on a combination of a plot pool public key 247 and a plot public key 243, as FIG. 10.

Optionally, the message 143 can include a plot storage location 261. configured to identify an address of a representative item of the plot 209. Such an item can be the plot private key 241, an entry of a proof space lookup table 211, etc. The address can be a logical address in a namespace configured to store the plot 209 and/or a physical address in the memory sub-system 110. In some implementations, the message 143 can include an address used in generating a response to a proof of space challenge and/or the response.

The message 143 can include a unique identification 111 as in FIG. 8. The unique identification can be a public identifier of the integrated circuit memory device 130, the memory sub-system 110 containing the memory device 130, and/or the endpoint 180 containing the memory sub-system 110.

Thus, the identity data 112 identifies not only the plot 209, but also the logical storage location of the plot 209 in the memory sub-system 110 and/or the endpoint 180 containing the memory sub-system 110. The physical storage location of the plot 209 can change over time as a result of wear leveling operations without a change in the logical storage location of the plot 209.

To prevent replay attack, the message 143 can include a cryptographic nonce or a random number. For example, prior to the generation of the identity data 112, the integrated circuit memory device 130 can receive the nonce or random number, from the security server 170 or another computer, for a communication session and/or for a request 251.

The message 143 can also include additional data 127, similar to the identity data 112 of FIG. 8.

Optionally, an internal host 201 is implemented as least in part via the integrated circuit memory device 130. The identity data 112 is generated by the integrated circuit memory device 130 identifying the plot 209 and the logical storage location of the plot 209. Thus, when the verification code 153 is determined to be correct, the security server 175 can conclude that the plot 209 is stored at least in part in the memory sub-system 110 at the logical storage location 261.

Figure 15:
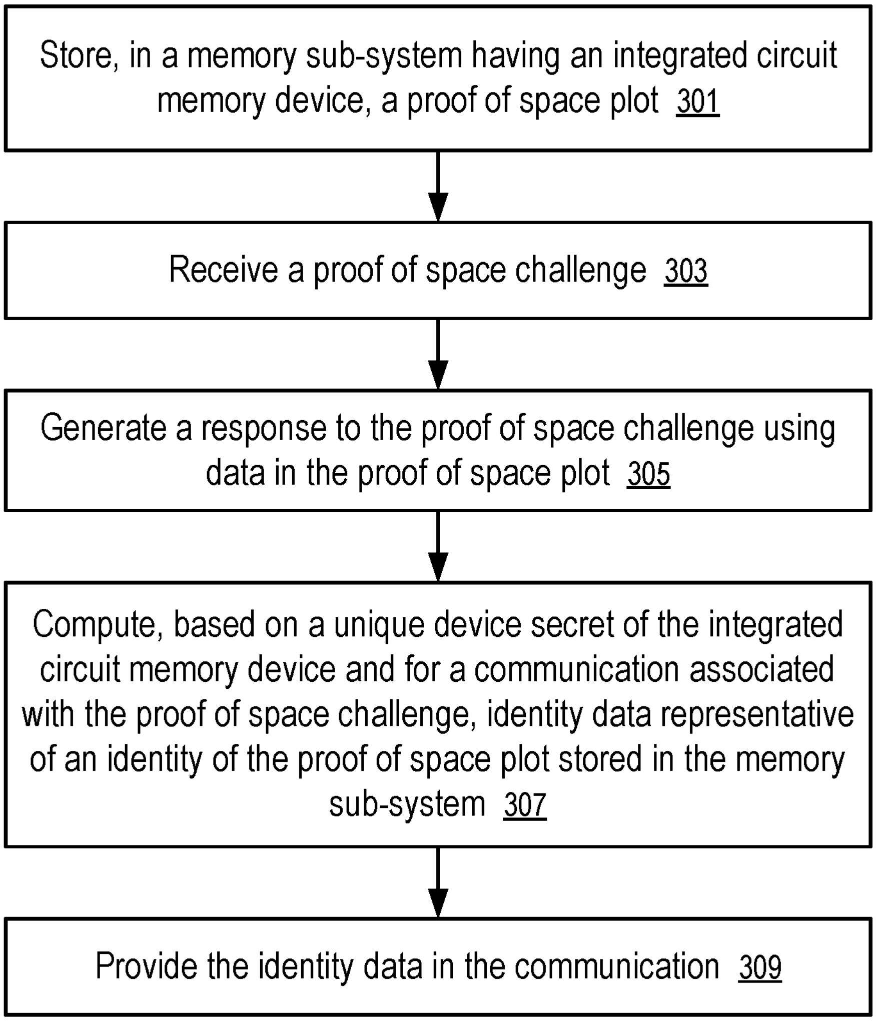
FIG. 15 shows a method to verify identity for proof of space according to one embodiment.

FIG. 15 shows a method to verify identity for proof of space according to one embodiment. For example, the method can be performed in a system having a security server 170 of FIG. 12 and a memory sub-system 110. The memory sub-system 110 can be as illustrated in FIG. 11, FIG. 12, and/or FIG. 13 having, or as, an integrated circuit memory device 130 as illustrated in FIG. 5, FIG. 7, and/or FIG. 11.

The operations in the memory sub-system 110 can be performed by processing logic that can include hardware (e.g., processing device, circuitry, dedicated logic, programmable logic, microcode, hardware of a device, integrated circuit, etc.), software/firmware (e.g., instructions run or executed on a processing device), or a combination thereof. Some operations performed in connection with the method of FIG. 15 are at least in part by the controller 115 and/or the local media controller 150 of the memory sub-system 110 in FIG. 1 to FIG. 5, and/or by the processing device 118 of the host system 120. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 301, a memory sub-system 110 having an integrated circuit memory device 130 stores a proof of space plot 209.

At block 303, the memory sub-system 110 receives a proof of space challenge.

At block 305, the memory sub-system 110 generates a response to the proof of space challenge using data in the proof of space plot 209.

At block 307, the integrated circuit memory device 130 computes, based on a unique device secret 101 of the integrated circuit memory device 130 and for a communication associated with the proof of space challenge, identity data 112 representative of an identity of the proof of space plot 209 stored in the memory sub-system 110.

For example, the proof of space plot 209 includes a plot private key 241 and proof of space lookup tables 211. The identity data 112 can have a message 143 containing an identification 249 of the proof of space plot 209. For example, a plot identification 249 of the proof of space plot 209 can be based on at least a plot public key 243 associated with the plot private key 241 in a key pair of asymmetric cryptography. Optionally, the message 143 in the identity data 241 includes a digital signature generated using the plot private key 241.

Optionally, the message 143 in the identity data 241 includes an identification of a plot storage location 261 of the proof of space plot 209 in the memory sub-system 110.

For example, the proof of space plot 249 can be stored at least in part in the integrated circuit memory device 130; and the plot storage location 261 can include a logical address of a portion of the proof of space plot 209 being read in generation of the response.

For example, the plot private key 241 can be stored in the integrated circuit memory device 130; and the plot storage location 261 can include an address of the plot private key 241 retrieved during the generation of the response.

Optionally, the message 143 in the identity data 241 includes an unique identification of the integrated circuit memory device 130, the memory sub-system 110, an endpoint 180 containing the memory sub-system 110, or an owner of the integrated circuit memory device 130, or any combination thereof.

The identity data 112 is configured to include a digital signature (e.g., verification code 153) signed, on the message 143 provided in the identity data 112, using a secret key 137 in the integrated circuit memory device 130.

For example, the secret key 137 is generated based on the unique device secret 101 within the integrated circuit memory device 130 after the completion of the manufacture of the integrated circuit memory device 130. The integrated circuit memory device 130 is configured to secure the unique device secret 101 in the integrated circuit memory device 130. After the completion of the manufacture of the integrated circuit memory device 130, the unique device secret 101 is not accessible from outside of the integrated circuit memory device 130.

At block 309, the memory sub-system 110 provides the identity data 112 in the communication.

The validity of the identity data 112 can be verified by a security server 170 having a copy of the unique device secret 101 of the integrated circuit memory device 130. During the manufacturing of the integrated circuit memory device 130, the copy of the unique device secret 101 is obtained and secured in the security server 170.

For example, after the proof of space plot 209 is stored in the memory sub-system 110 having the integrated circuit memory device 130, the security server 170 and the memory device 130 can communicate with each other to independently generate the secret key 137 to represent a unique combination of the proof of space plot 209, the memory sub-system 110, the integrated circuit memory device 130. The combined identity, communicated via the identity data 112, can be validated for proof of space reserved/used for the proof of space lookup tables 211 and proof of identity associated with the unique device secret 101.

In one embodiment, a method is provided to manage cryptographic keys for proof of space according to one embodiment. For example, the method can be performed in a security server 170 of FIG. 10 and/or FIG. 11, in communication with a memory sub-system 110. The memory sub-system 110 can be as illustrated in FIG. 11 having, or as, an integrated circuit memory device 130 as illustrated in FIG. 5, FIG. 7, and/or FIG. 11.

The operations in the memory sub-system 110 can be performed by processing logic that can include hardware (e.g., processing device, circuitry, dedicated logic, programmable logic, microcode, hardware of a device, integrated circuit, etc.), software/firmware (e.g., instructions run or executed on a processing device), or a combination thereof. Some operations performed in connection with the method of FIG. 15 are at least in part by the controller 115 and/or the local media controller 150 of the memory sub-system 110 in FIG. 1 to FIG. 5, and/or by the processing device 118 of the host system 120. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In the method, a security server 170 stores a plurality of cryptographic keys, including a first cryptographic key (e.g., secret key 137) representative of an identity of a memory device 130, a second cryptographic key (e.g., access privilege key 148) representative of a privilege to access a memory region 133 in the memory device 130, and a third cryptographic key (e.g., plot pool private key 245) representative of a pool of proof of space plots (e.g., 209).

For example, the security server 170 can be a computing system having a network interface, memory and at least one processor configured via instructions to perform operations in the method of FIG. 15. The security server 170 can include a key management server that has hardware configured to implement strong security measures against hacking and unauthorized access, such as the use of hardware security module (HSM).

The security server 170 communicates with a memory sub-system 110 containing the memory device 130 to generate a proof of space plot 209 in the pool.

For example, the proof of space plot 209 can be generated in the memory sub-system 110 before an identity of an entity that will farm the plot 209 is known. For example, the proof of space plot 209 can be generated and/or pre-stored in the memory sub-system 110 during the manufacture of the memory sub-system 110; and the plot 209 can be provided as a by-product of the manufacturing the memory sub-system 110. Alternatively, an owner of the memory sub-system 110 may generate the plot 209 for subsequent transfer to a plot farmer for farming, where the identity of the plot farmer is unknown at the time of the plot generation. Thus, it is advantageous to have the pool managed by the security server 170 at least initially at the time of plot generation. In some instances, a plot farmer may opt to use the services of the security server 170 and have their plots generated in a pool managed by the security server 170.

For example, the security server 170 can be configured to generate an asymmetric cryptographic key pair, including the third cryptographic key as a private key (e.g., plot pool private key 245) and a fourth cryptographic key as a public key (e.g., plot pool public key 247) in the pair. The security server 170 can provide the public key (e.g., plot pool public key 247) for public identification of the pool represented by the private key (e.g., plot pool private key 245) and for the verification of digital signatures created using the private key.

For example, during initiation of the plot generation, the security server 170 can receive a communication from the memory sub-system 110 to generate the plot 209 in the pool. In response, the security server 170 can determine an identifier of an owner of the memory sub-system 110 based on the first cryptographic key (e.g., secret key 137) and identify the pool based on the identifier of the owner.

For example, the owner can be a manufacturer of the memory device 130, a manufacturer of the memory sub-system 110 containing the memory device 130, or a manufacturer of an endpoint 180 containing the memory sub-system 110. The security server 170 can create different pools for different owners represented by their respective identifiers.

For example, the security server 170 can record to store, during manufacture of the memory device 130, a unique device secret 101 of the memory device 130. Subsequently, the first cryptographic key (e.g., secret key 137) is generated based on the unique device secret 101 to represent the identity of the memory device 130, the identity of the memory sub-system 110 containing the memory device 130, and/or the identity of the endpoint 180 containing the memory sub-system 110. The second cryptographic key (e.g., access privilege key 148) is generated to represent the privilege to access the secure memory region 133 in the memory device 130 and stored in the security server 170 in associate with the unique device secret 101. The third cryptographic key (e.g., plot pool private key 245) representative of the pool of proof of space plots can also be stored in the security server 170 in association with the unique device secret 101. Optionally, the plot pool private key 245 can be generated based at least in part on the unique device secret 101.

For example, in response to a determination of a change of ownership of the memory device 130 from a manufacturer of the memory device 130 (or the memory sub-system 110, or the endpoint 180) to an entity, the security server 170 can transfer the second cryptographic key (e.g., access privilege key 148) and the third cryptographic key (e.g., plot pool private key 245) to a computer of the entity. Subsequently, the computer operated by (or operated for) the entity can sign commands to access the secure memory region 133 and sign blocks 223 created using the plots (e.g., 209) in the pool represented by the plot pool private key 245.

Before the transfer of the plot pool private key 245, the security server 170 can sign blocks (e.g., 223) on behalf of a user of the plot 209 in a blockchain 221, as further discussed below.

The security server 170 receives a request to sign a block 223, in a blockchain 221, created via the proof of space plot 209.

For example, an entity can be selected in the cryptocurrency network 217 to create the block 223 in the blockchain 221 through a successful response to a proof of space challenge using the plot 209.

Using the third cryptographic key (e.g., plot pool private key 245), the security server 170 computes a digital signature for the block 223.

The security server 170 provides, in a response to the request, the digital signature to facilitate the recording of the block 223 in the blockchain 221.

Optionally, the security server 170 is configured to organize plots into pools based on identifiers of owners. When an identifier of a current owner has no associated plot pool keys, the security server 170 generates a plot pool private key 245 for a pool created for association with the identifier of the owner.

Optionally, the security server 170 is configured to organize one plot in one pool, for enhanced flexibility of transferring plots to different plot farmers. For example, the plot pool private key 245 can be generated in response to a communication from the memory sub-system 110 to initiate generation of the proof of space plot 209. The security server 170 is configured to add to the pool, represented by the plot pool private key 245, the proof of space plot 209 but not any other plots.

Optionally, the security server 170 can also generate, in response to a communication to initiate generation of the proof of space plot 209, an asymmetric cryptographic key pair including a fifth cryptographic key (e.g., plot private key 241) as a private key representative of the proof of space plot 209 and a sixth cryptographic key (e.g., plot public key 243) as a public key in the pair. The security server 170 provides the fifth cryptographic key (e.g., plot private key 241) to the memory sub-system for generation of the proof of space plot 209.

In some instances, a same key is used both as the access privilege key 148 and the plot pool private key 245. For example, the access privilege key 148 can be used to represent an owner privilege to access the secure memory region 133 in the memory device 130; and one or more plots stored in the memory device 130 (e.g., in the secure memory region 133, or in the non-secure memory region 131), or in a memory sub-system 110 containing the memory device 130 (e.g., stored in another memory device 140 of the memory sub-system 110).

In some implementations, the proof of space lookup tables 211 are generated based at least in part on the plot pool public key 247 and/or the plot pool private key 245. Thus, after the generation of the plot 209, the pool represented by the plot pool private key 245 may not be changed for the plot 209.

In one embodiment, a method is provided to perform computations related to proof of space in a memory sub-system. For example, the method 12 can be implemented using a memory sub-system 110 of FIG. 3 and/or FIG. 4, having an integrated circuit memory device 130 of FIG. 5 and/or FIG. 7.

In the method, a memory sub-system 110 (e.g., a solid state drive (SSD)) receives, from a host system 120 connected to a host interface of the memory sub-system 110, configuration data 203.

In some implementations, a communication interface 147 of the memory device 130 is configured as the host interface of the memory sub-system 110 (e.g., in a ball grid array (BGA) solid-state drive (SSD)). In other implementations, the memory sub-system 110 has a circuit, separate from the communication interface 147 of the memory device 130, as its host interface.

The host interface of the memory sub-system 110 is configured to receive at least read commands and write commands from the host system 120. The memory sub-system 110 has memory cells formed in one or more arrays 165 on at least one integrated circuit die. A processing device (e.g., 117, or controller 115 or 150) of the memory sub-system 110 is configured to control executions of the read commands to retrieve data from the memory cells and executions the write commands to store data into the memory cells. The memory sub-system 110 has at least one computation accelerator 160 adapted to perform a type of computations involved in generation of proof of space plots more efficient than the processing device.

For example, the computation accelerator 160 can include an accelerator 163 configured to accelerate Basic Linear Algebra Subprograms (BLAS).

For example, the computation accelerator 160 can include a Multiply-Accumulate Unit 167 that accelerates multiplication and accumulation operations in matrix/vector computation.

For example, the Multiply-Accumulate Unit 167 can include a crossbar array of memristors configured to perform multiplication and accumulation operations via analog circuitry. Alternatively, the Multiply-Accumulate Unit 167 can include a logic circuit configured to perform multiplication and accumulation operations.

For example, the computation accelerator 160 can further include a logic circuit of a cryptographic engine 107 adapted to perform cryptographic operations involved in cryptocurrency activities.

The memory sub-system 110 performs, according to the configuration data 203, computations of proof of space activities.

For example, the proof of space activities can include plot generation and/or plot farming in a cryptocurrency network 217.

The memory sub-system 110 accelerates, using a computation accelerator 160 of the memory sub-system 110, the computations of proof of space activities.

In some instances, the computations are in response to step-by-step commands from the host system 120. In other instances, the computations can be controlled autonomously by an internal host 201 configured according to the configuration data 203.

For example, the memory sub-system 110 participates, according to the configuration data 203, in cryptocurrency activities in a cryptocurrency network 217 when the host system 120 is in a low power mode, a sleep mode, or a hibernation mode, or when the host system 120 is not actively using the memory sub-system 110. The internal host 201 can control the participation of the memory sub-system 110 in the cryptocurrency network 217 without computational assistance from the host system 120.

Optionally, the memory sub-system 110 receives commands from the host system 120 to pre-process data using the computation accelerator 160; and in response, the memory sub-system 110 executes the commands using the computation accelerator 160.

For example, in some instances, the host system 120 generates the commands to use the memory sub-system 110 in cryptocurrency activities, such as plot generation or plot farming. In other instances, the host system 120 generates the commands to use the memory sub-system 110 to perform other types of computations accelerated by the computation accelerator 160, such as computations of an Artificial Neural Network (ANN).

Optionally, the integrated circuit memory device 130 in the memory sub-system 110 includes a secure memory region 133 adapted to store firmware, software, or an operating system, or any combination thereof. The cryptographic engine 107 can be used by the integrated circuit memory device 130 to implement an access controller 109 of a security manager 161 to control access to the secure memory region 133 via cryptography. The security manager 161 checks integrity of the data (e.g., unexpected changes or corruptions) stored in the secure memory region prior to the data being loaded for execution in the memory sub-system 110 and/or verifies digital signatures of commands accessing the secure memory region 133 prior to executing the commands to prevent unauthorized access.

In one embodiment, a method is provided to control proof of space activities. For example, the method can be implemented via operations performed by a proof of space manager 113 in an internal host 201 of FIG. 2 with configuration data 203 of FIG. 6.

In the method, a memory sub-system 110 having an internal host 201 receives configuration data 203 from a user of the memory sub-system 110.

For example, the memory sub-system 110 has a host interface configured to be coupled to a peripheral bus (e.g., a USB bus, a SATA bus, a PCI bus, a PCIe bus, etc.) to receive commands from a host system 120. The host system 120 can run an application to present a graphical user interface 213 for the user to specify the configuration data 203. For example, the configuration data 203 can include some or all of the items illustrated in FIG. 6.

Alternatively, the internal host 201 can function as a host of a network interface 215 and use the network interface 215 to establish a network connection to a user device. The user can use the user device to specify the configuration data 203 over the network connection.

Optionally, the memory sub-system 110 can have a transceiver operable to establish, under the control of the internal host 201, a wired or wireless network connection to a computer network without assistance from the host system 120. The user can use a user device to specify the configuration data 203 over the network connection established using the transceiver of the memory sub-system 110.

The memory sub-system 110 can have a controller 115 that controls executions of commands to retrieve data from and store data to the data storage medium of the memory sub-system 110. The commands can be from the host system 120, or from the internal host 201. For example, a processing device 117 of the controller 115 can execute firmware to implement the control. Optionally, the internal host 201 is also implemented via firmware executed by the processing device 117. Alternatively, a separate, internal host interface is configured in the memory sub-system 110 to connect the internal host 201 to the memory sub-system controller 115.

When the internal host 201 is implemented via firmware, the firmware of the internal host 201 and/or the configuration data 203 can be stored in a secure memory device (e.g., 130 illustrated in FIG. 7). The secure memory device 130 is configured to determine integrity of the firmware and the configuration data of the internal host 201, and control write access to the memory cells in a secure memory region 133 based on privileges represented by cryptographic keys, as in FIG. 9. For example, the secure integrated circuit memory device 130 can have a security manager 161 configured to prevent unauthorized access to the secure memory region 133 and to detect corruptions or changes in the firmware stored in the portion of the memory cells.

In one implementation, the memory sub-system 110 is a solid state drive (SSD); and the data storage medium includes the storage capacity 205 provided by memory cells formed on one or more integrated circuit dies of memory devices (e.g., 130, 140). In another implementation, the memory sub-system 110 is a hard disk drive (HDD).

The memory sub-system 110 stores the configuration data 203 in the memory sub-system 110.

The memory sub-system 110 controls operations of the internal host 201 according to the configuration data 203.

For example, the configuration data 203 can specify whether the internal host 201 is allowed to operate autonomously and independent from the host system 120, a limit or restriction 231 on resources usable by the internal host 201 to participate in proof of space activities, an identification of a type of proof of space activities the internal host 201 is allowed to participate autonomously, a condition to allow the internal host to operate autonomously, or an account identification 235 in the cryptocurrency network 217, or any combination thereof.

The internal host 201 detects a network connection.

The memory sub-system 110 communicates, using the network connection without assistance from a host system 120 connected to a host interface of the memory sub-system 110, with a cryptocurrency network 217.

For example, under the control of the internal host 201, the memory sub-system 110 can communicate with the cryptocurrency network 217 while the host system 120 is in a sleep/hibernation mode, or without the memory sub-system 110 being connected to a host system 120.

The internal host 201 generates, independent of the host system 120, commands to operate on memory cells in the memory sub-system 110 in participation in proof of space activities in the cryptocurrency network 217.

For example, the internal host 201 can generate write commands to store a plot 209 in the memory cells of a memory device 130 configured in the memory sub-system 110. The internal host 201 can perform the computations to generate the plot 209, or receive the plot 209 over the network connection. The plot 209 includes a plurality of lookup tables usable to generate a response to a proof of space challenge.

For example, the internal host 201 can generate read commands to use a plot 209 stored in the memory cells of a memory device 130 configured in the memory sub-system 110 to generate a response to a proof of space challenge.

Thus, the internal host 201 can use the storage capacity 205 in an autonomous way to generate plots, store plots, and/or farm plots in an application of proof of space (e.g., in a cryptocurrency network 217), without using the resources of an external host system 120. The resources of the memory sub-system 110 used by the internal host 201 in the proof of space activities and/or cryptocurrency activities can be controlled by the configuration data 203 to avoid undesirable performance degradation in servicing the external host system 120.

A non-transitory computer storage medium can be used to store instructions of the firmware of a memory sub-system (e.g., 110). When the instructions are executed by the controller 115 and/or the processing device 117, the instructions cause the controller 115, the processing device 117, and/or a separate hardware module to perform the methods discussed above.

Figure 16:
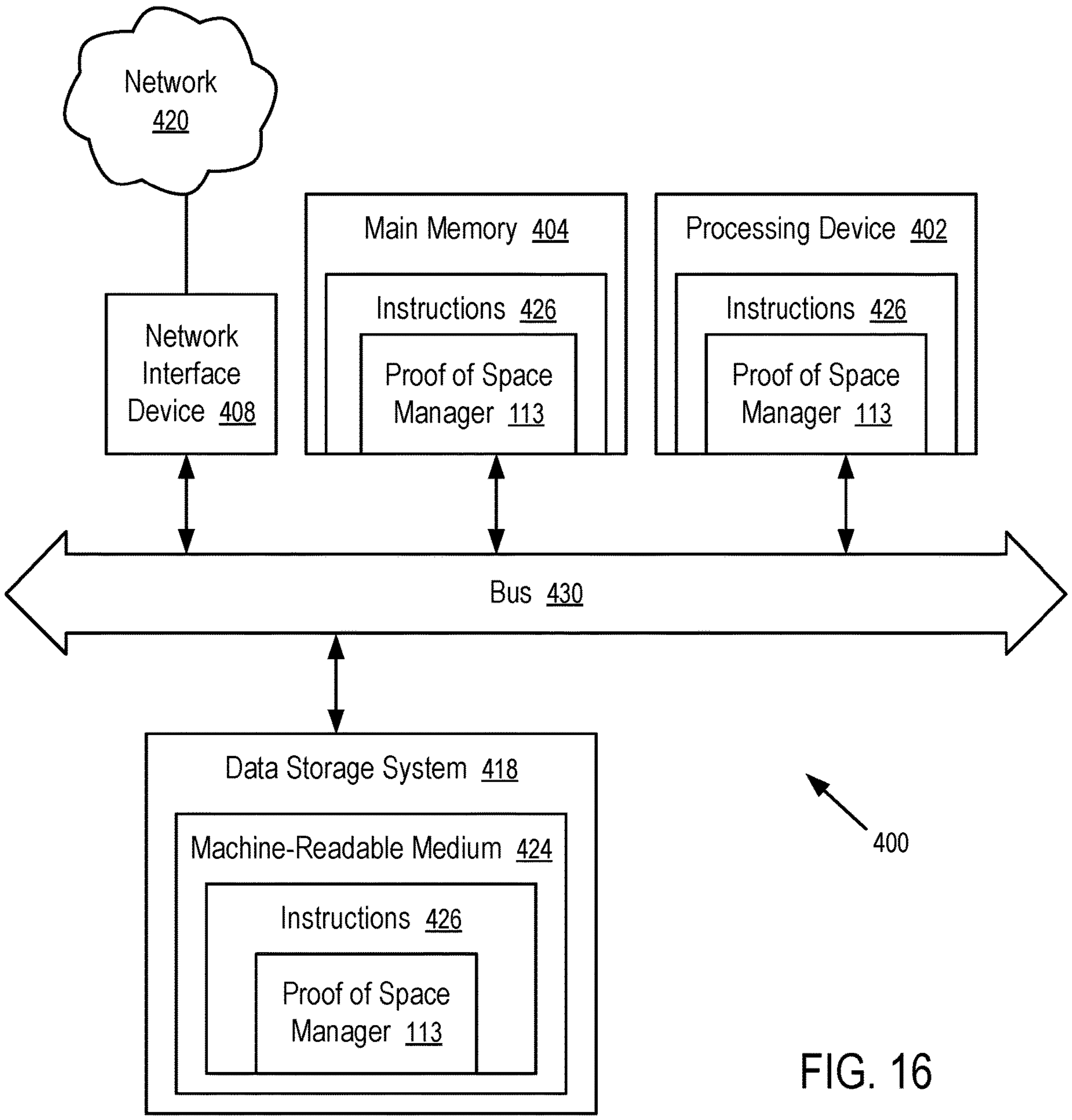
FIG. 16 is a block diagram of an example computer system in which embodiments of the present disclosure can operate.

FIG. 16 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations of a proof of space manager 113 (e.g., to execute instructions to perform operations corresponding to the proof of space manager 113 described with reference to FIGS. 1-7). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 418, which communicate with each other via a bus 430 (which can include multiple buses).

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable medium 424, data storage system 418, and/or main memory 404 can correspond to the memory sub-system 110 of FIG. 1.

In one embodiment, the instructions 426 include instructions to implement functionality corresponding to a proof of space manager 113 (e.g., the proof of space manager 113 described with reference to FIGS. 1-7). While the machine-readable medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:

storing, in a memory sub-system having an integrated circuit memory device, a proof of space plot comprising a set of lookup tables;

receiving a proof of space challenge;

generating a response to the proof of space challenge using the lookup tables in the proof of space plot, wherein the response to the proof of space challenge is indicative of the memory sub-system having (i) a minimum storage capacity level sufficient to store the proof of space plot and (ii) a proof of possession of the lookup tables stored in the memory sub-system, wherein the generating of the response to the proof of space challenge using the lookup tables in the proof of space plot comprises reading only a portion of the proof of space plot to generate the response;

computing, based on a unique device secret of the integrated circuit memory device and for a communication associated with the proof of space challenge, identity data representative of an identity of the proof of space plot stored in the memory sub-system; and providing the identity data in the communication.

2. The method of claim 1, wherein the proof of space plot includes a plot private key; the identity data includes an identification of the proof of space plot; and the identification of the proof of space plot is based at least on a plot public key associated with the plot private key in a key pair of asymmetric cryptography.

3. The method of claim 2, wherein the identity data includes a digital signature generated using the plot private key.

4. The method of claim 3, wherein the identity data includes an identification of a plot storage location of the proof of space plot in the memory sub-system.

5. The method of claim 4, wherein the proof of space plot is stored at least in part in the integrated circuit memory device; and the plot storage location includes an address of a portion of the proof of space plot being read in generation of the response.

6. The method of claim 5, wherein the identity data includes an unique identification of the integrated circuit memory device, the memory sub-system, or an endpoint containing the memory sub-system, or any combination thereof.

7. The method of claim 6, wherein the identity data includes a digital signature signed, on a message provided in the identity data, using a secret key in the integrated circuit memory device; and the secret key is generated based on the unique device secret within the integrated circuit memory device.

8. The method of claim 7, wherein the unique device secret is not accessible from outside of the integrated circuit memory device after completion of manufacture of the integrated circuit memory device.

9. A memory sub-system, comprising:

a processing device;

a storage medium operable to store a proof of space plot; and an integrated circuit having a unique device secret;

wherein in response to a proof of space challenge, the processing device is configured to generate a response to the proof of space challenge using data in the proof of space plot, wherein the response to the proof of space challenge is indicative of the storage medium having (i) a minimum storage capacity level sufficient to store the proof of space plot and (ii) a proof of possession of the proof of space plot stored in the storage medium, wherein generation of the response to the proof of space challenge in the proof of space plot comprises reading only a portion of the proof of space plot to generate the response;

wherein the integrated circuit is configured to compute, based on the unique device secret and for a communication associated with the proof of space challenge, identity data representative of an identity of the proof of space plot stored in the memory sub-system; and wherein the memory sub-system is configured to provide the identity data in the communication.

10. The memory sub-system of claim 9, wherein the proof of space plot includes a plot private key stored in the integrated circuit; the identity data includes an identification of the proof of space plot; and the identification of the proof of space plot is based at least on a plot public key associated with the plot private key in a key pair according to asymmetric cryptography.

11. The memory sub-system of claim 10, wherein the identity data includes a digital signature generated using the plot private key.

12. The memory sub-system of claim 11, wherein the identity data includes a message containing an identification of a plot storage location of the proof of space plot in the memory sub-system.

13. The memory sub-system of claim 12, wherein the plot storage location includes an address of the plot private key of the proof of space plot.

14. The memory sub-system of claim 13, wherein the message includes an unique identification of the integrated circuit, the memory sub-system, or an endpoint containing the memory sub-system, or any combination thereof.

15. The memory sub-system of claim 14, wherein the identity data includes a digital signature signed, on the message provided in the identity data, using a secret key in the integrated circuit; and the secret key is generated based on the unique device secret within the integrated circuit.

16. The memory sub-system of claim 15, comprising:

an integrated circuit memory device containing the integrated circuit and at least a portion of the storage medium, wherein the unique device secret is inaccessible from outside of the integrated circuit memory device after completion of manufacture of the integrated circuit memory device, and the secret key is generated within the integrated circuit memory device after the completion of manufacture of the integrated circuit memory device.

17. A system, comprising:

an integrated circuit memory device having:

memory cells; and a logic circuit configured to:

control, using cryptographic keys, access to at least a portion of the memory cells;

generate, based at least in part on a unique device secret of the integrated circuit memory device, identity data representative of an identity of a proof of space plot stored at least in part in the memory cells;

generate a response to a proof of space challenge that is indicative of the memory cells having (i) a minimum storage capacity level sufficient to store the proof of space plot and (ii) a proof of possession of the lookup tables stored in the memory sub-system, wherein generation of the response to the proof of space challenge in the proof of space plot comprises reading only a portion of the proof of space plot to generate the response; and provide the identity data in connection with access to the proof of space plot.

18. The system of claim 17, wherein the proof of space plot includes a plot private key stored in the memory cells; and the identity data includes an identification of a location of the plot private key stored in the memory cells.

19. The system of claim 18, wherein the logic circuit is configured to sign the identity data using a secret key generated from the unique device secret.

20. The system of claim 19, wherein the identity data includes an identifier representative of an owner of the integrated circuit memory device and an identifier representative of the proof of space plot.

21. The method of claim 1, wherein the proof of space challenge comprises a reference to a plot storage location of the proof of space plot, and further wherein the portion of the proof of space plot read to generate the response is based on the plot storage location.

* * * * *